US011796625B2

(12) United States Patent
Dwivedi et al.

(10) Patent No.: US 11,796,625 B2
(45) Date of Patent: Oct. 24, 2023

(54) PROVISION OF POSITIONING REFERENCE SIGNALS

(71) Applicant: Telefonaktiebolaget LM Ericsson (PUBL), Stockholm (SE)

(72) Inventors: Satyam Dwivedi, Solna (SE); Henrik Rydén, Solna (SE); Sara Modarres Razavi, Linköping (SE); Fredrik Gunnarsson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 317 days.

(21) Appl. No.: 17/268,993

(22) PCT Filed: Aug. 17, 2018

(86) PCT No.: PCT/EP2018/072366
§ 371 (c)(1),
(2) Date: Feb. 17, 2021

(87) PCT Pub. No.: WO2020/035153
PCT Pub. Date: Feb. 20, 2020

(65) Prior Publication Data
US 2022/0196780 A1    Jun. 23, 2022

(51) Int. Cl.
*G01S 5/00* (2006.01)
*H04L 5/00* (2006.01)
(Continued)

(52) U.S. Cl.
CPC .......... *G01S 5/0063* (2013.01); *H04L 5/0051* (2013.01); *H04W 8/12* (2013.01);
(Continued)

(58) Field of Classification Search
CPC ... G01S 5/0063; H04L 5/0051; H04L 5/0069; H04W 8/12; H04W 56/001; H04W 72/0446; H04W 72/0453; H04W 72/51
See application file for complete search history.

(56) References Cited

U.S. PATENT DOCUMENTS

| 2015/0296359 | A1* | 10/2015 | Edge ..................... G01S 1/0428 455/404.2 |
| 2017/0086153 | A1* | 3/2017 | Yoon .................. H04W 56/001 |
| 2018/0217228 | A1 | 8/2018 | Edge et al. |

OTHER PUBLICATIONS

EPO Communication dated May 2, 2022 for Patent Application No. 18756240.0, consisting of 6-pages.
(Continued)

*Primary Examiner* — Dinh Nguyen
(74) *Attorney, Agent, or Firm* — Christopher & Weisberg, P.A.

(57) ABSTRACT

Some embodiments advantageously provide methods, wireless devices and network nodes for adapting PRS transmission to hide the local clock information of base stations. According to one aspect, an exemplary process includes a network node for transmitting PRS. The process includes delaying or advancing the transmission of at least one positioning reference signal in accordance with received offset information wherein delaying or advancing the transmission according to the offset information shifts the transmission of the at least one positioning reference signal away from a scheduled transmission time for the at least one positioning reference signal transmission.

7 Claims, 19 Drawing Sheets

(51) Int. Cl.
  *H04W 8/12* (2009.01)
  *H04W 56/00* (2009.01)
  *H04W 72/0446* (2023.01)
  *H04W 72/0453* (2023.01)
  *H04W 72/51* (2023.01)

(52) U.S. Cl.
  CPC ..... *H04W 56/001* (2013.01); *H04W 72/0446* (2013.01); *H04W 72/0453* (2013.01); *H04W 72/51* (2023.01)

(56) References Cited

OTHER PUBLICATIONS

India Office Action dated Feb. 1, 2022 for Patent Application No. 202147010816, consisting of 6-pages.
PCT Notification of Transmittal of the International Search Report and the Written Opinion of the International Saerching Authority, or the Declaration issued for International application No. PCT/EP2018/072366—dated May 28, 2019.
3GPP TSG-RAN Ad-Hoc Meeting #2, Dublin, Ireland; Source: Motorola; Title: Improving PRS Hearability by Time-Offsetting PRS Subframes (R4-101323)—Apr. 12, 16, 2010.

\* cited by examiner

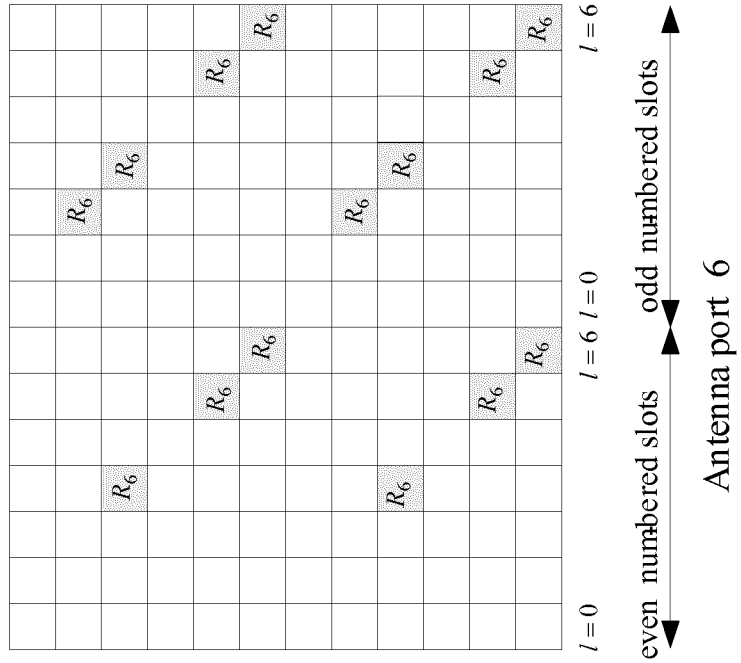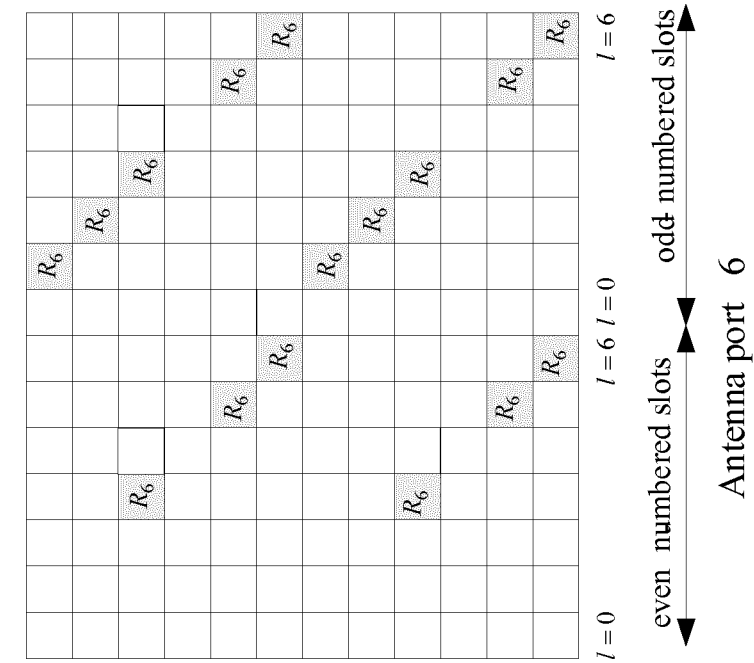
Fig. 3

700

```
┌─────────────────────────────────────────┐
│                  710                    │
│       Register with the location server │
└─────────────────────────────────────────┘
                    │
                    ▼
┌─────────────────────────────────────────┐
│                  720                    │
│     Receive a request for timing        │
│              information                │
└─────────────────────────────────────────┘
                    │
                    ▼
┌─────────────────────────────────────────┐
│                  730                    │
│         Provide timing information      │
└─────────────────────────────────────────┘
                    │
                    ▼
┌─────────────────────────────────────────┐
│                  740                    │
│  Obtain offset information relating to  │
│          transmission of PRS            │
└─────────────────────────────────────────┘
                    │
                    ▼
┌─────────────────────────────────────────┐
│                  750                    │
│ Delaying or advancing transmission of   │
│   positioning reference signal away     │
│     from scheduled transmission time.   │
└─────────────────────────────────────────┘
```

Fig. 10

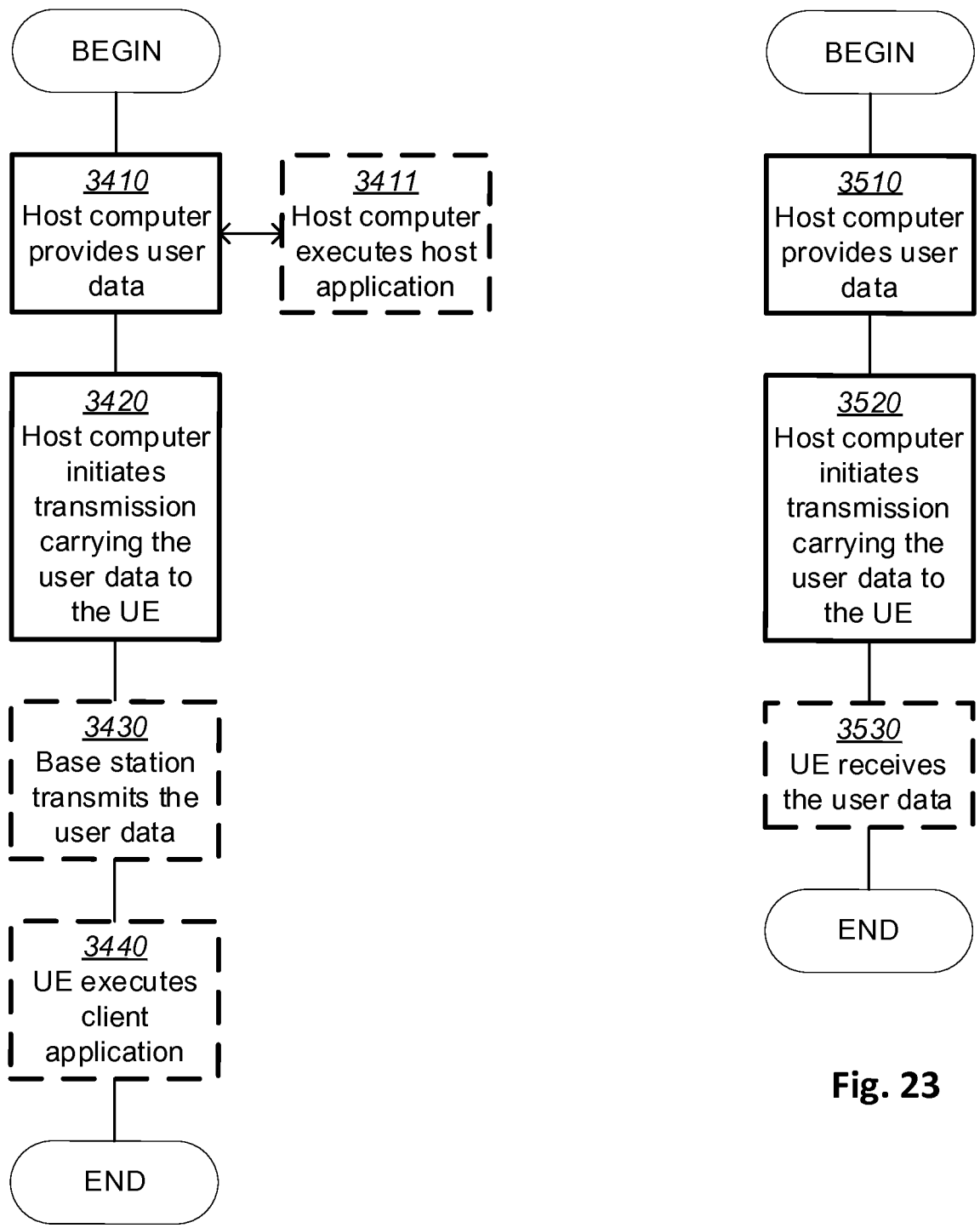

PROVISION OF POSITIONING REFERENCE SIGNALS

TECHNICAL FIELD

Embodiments herein relate generally to the provision of positioning reference signals and delaying or advancing the transmission of positioning reference signals.

BACKGROUND

Location-based services and emergency call positioning drives the development of positioning in wireless networks and a plethora of applications and services in terminals take advantage of the position. Positioning in $3^{rd}$ Generation Partnership Project (3GPP) Long Term Evolution (LTE) is supported by the architecture 60 in FIG. 1, with direct interactions between a UE 10 and a location server or Evolved-Serving Mobile Location Centre (E-SMLC) 50 via the LTE Positioning Protocol (LPP), e.g. as specified by 3GPP TS 36.355 V.15.0.0 (2018 Jul. 5). Moreover, there are also interactions between the location server 50 and the eNodeB 20 via the LPPa protocol, e.g. as specified by 3GPP TS 36.455 V15.0.0 (2018 Jun. 22) to some extent supported by interactions between the eNodeB 20 and the UE 10 via the Radio Resource Control (RRC) protocol, e.g. as specified by 3GPP TS 36.331 V15.2.2 (2018 Jul. 10). The Gateway Mobile Location Centre (GMLC) 40 provides information coding for the Evolved Packet Core (EPC) Location Services (LCS) Protocol (ELP) that is needed to support the location services in E-UTRAN, UTRAN and GERAN. The ELP message set is applicable to the SLg interface between the Mobility Management Entity (MME) 30 and the GMLC 40, see for example 3GPP TS 29.172 V15.0.0 (2018 Jun. 23). The LCS Application Protocol (LCS-AP) between the MME 30 and the E-SMLC 50 provides procedures and information coding needed to support location services in E-UTRAN. See for example 3GPP TS 29.171 V15.0.0 (2018 Jun. 18).

The following positioning techniques are considered in LTE, see for example 3GPP TS 36.305 V15.0.0 (2018 July):
  Enhanced Cell ID. Essentially cell ID information to associate the UE to the serving area of a serving cell, and then additional information to determine a finer granularity position.
  Assisted Global Navigation Satellite System (GNSS). GNSS information retrieved by the UE, supported by assistance information provided to the UE from E-SMLC.
  OTDOA (Observed Time Difference of Arrival). The UE estimates the time difference of reference signals from different base stations and sends to the E-SMLC for multilateration.
  UTDOA (Uplink TDOA). The UE is requested to transmit a specific waveform that is detected by multiple location measurement units (e.g. an eNB) at known positions. These measurements are forwarded to E-SMLC for multilateration In the Observed Time Difference Of Arrival (OTDOA), the UE measures the time of arrival (TOA) of specific positioning reference signals (PRS) from multiple cells (eNBs), and computes the relative differences between each cell and a reference cell. These reference signal time difference (RSTD) are quantized and reported via LPP to the E-SMLC together with an accuracy assessment. Based on known positions of eNBs and their mutual time synchronization, it is possible for the E-SMLC to estimate the UE position from the RSTD and covariance reports using multilateration. The accuracy depends on the radio conditions of the received signals, number of received signals as well as the deployment, which means that it will vary spatially. FIG. 2 illustrates the multilateration in OTDOA while considering eNB1 20a as the reference cell. The UE measures the time of arrival of a PRS received from eNB1 and subtracts from a corresponding time of arrival of a 'synchronised' PRS received from eNB2 20b i.e. $(t_2-t_1)$, in a second measurement the UE measures the time of arrival of a PRS received from eNB1 and subtracts from a corresponding time of arrival of a 'synchronised' PRS received from eNB3 20c i.e. $(t_3-t_1)$. In this context, 'synchronised' means that the PRS are intended to be transmitted as the same time, and therefore the observed time difference of arrival indicates a relative distance of the UE from the respective eNB with respect to the reference eNB. In reality the PRS are not synchronized due to local clock errors between the base stations, however the term 'synchronised' is used to indicate the intention that the PRS are intended to be transmitted simultaneously. The OTDOA method has been considered as a UE-assisted method, in which the measured RSTD is sent to the network (e.g. E-SMLC) for positioning estimation. In LTE Rel. 15, there is an agenda item which proposes the support for UE-based OTDOA.

In principle, it is possible to measure RSTD on any downlink signals e.g., CRS. However as in OTDOA the UE requires to detect multiple neighbor-cell signals, these signals suffer from poor "hearability". Hence, positioning reference signals (PRSs) have been introduced to improve OTDOA positioning performance. FIG. 3 shows the arrangement of PRS assigned resources for one resource block using normal Cyclic Prefix (CP) and FIG. 4 shows extended CP. In such a PRS subframe, in order to reduce the interference with neighbour cells, no Physical Downlink Shared Channel (PDSCH) data is carried. Physical Downlink Control Channel (PDCCH) and Cell Reference Signal (CRS)s are retained in the subframe, while PRSs are distributed in a "diagonal" way in between CRSs. In a similar manner as for CRS, cell-specific frequency shift (the number of frequency shift given by physical cell id (PCI) modulo 6) is applied to PRS pattern, which helps avoid time-frequency PRS collision up to six neighbour cells.

In time-frequency based resource system such as an LTE system, time-frequency resources are defined by a time-frequency resource grid comprising a division in the time domain into frames, subframes and symbols, see for example 3GPP TS 36.211 V15.2.0 (2018 Jul. 5).

Consecutive PRS subframes, also termed, 'positioning occasions' are transmitted periodically in the downlink. One PRS occasion may contain up to six consecutive PRS subframes. The period of one positioning occasion can be configured to every 160, 320, 640 and 1280 milliseconds. It is noted that, in TDD mode, uplink subframe and other special frames cannot contain PRSs. Another parameter to characterize the PRS transmission schedule is the cell specific subframe offset, which defines the starting subframe of PRS transmission relative to SFN=0. As shown in Table 1, the PRS periodicity and subframe offset are derived from the PRS Configuration Index.

TABLE 1

Positioning reference signal subframe configuration

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-4095 | Reserved | |

In some cases, in particularly dense deployment, only cell-specific frequency shift may not be sufficient to avoid interference from neighbour cells. Therefore, PRS muting has been introduced to further reduce inter-cell interference by muting PRS transmission in other cells based on a periodical "muting pattern". The PRS muting configuration of a cell is defined by a periodic muting sequence with a periodicity of $T_{REP}$, where $T_{REP}$ counted in number of PRS positioning occasions can be 2, 4, 8, or 16. Correspondingly, the PRS configuration is represented by a bit string of length 2, 4, 8, or 16.

The timing error in base stations is partly caused by clock drift, i.e. when the clock does not run exactly as a reference time. FIG. 5 shows the time measured in seconds using a clock as a function of the reference time t, where the reference time is the same as the universally accepted Coordinated Universal Time (UTC). As shown in FIG. 5, β is the initial time offset. Time measured at a node using its own clock is a function of true time t, also accepted as UTC.

FIG. 6 shows the relative timing between clocks of two network nodes eNB 1 and eNB 2, in this example, the clock of eNB 2 is the reference time. As shown in FIG. 6, the relation between true clocks is often linear. Then, the relation can be specified with two parameters α and β, as $C_2(t)=\alpha C_1(t)+\beta$. Where β is the initial time offset between two clocks at any particular instance and a is the relative skew between the two clocks. In the ideal case alpha would be 1 and beta would be 0). $C_i(t)$ is the time measured at the node i using its clock. These clocks are also used for transmissions and receptions of signals from eNodeBs. The parameters α and β between a pair of eNodeBs for example can be estimated by running Precision Time Protocol (PTP) in LTE.

In UE-based positioning, the UE calculates RSTDs between base stations. Ideally, if two base stations transmit at the same time, the RSTD should correspond to the difference in time-of-flight of PRSs from the two base stations. However, due to the synchronization error, i.e. the difference in time of transmission for PRS, it adds a bias according to FIG. 6 of $\beta=C_2(t)-C_1(t)$, when the transmission time from both base station is t. The time error between pairs of base stations can result in significant loss of precision in position estimation. In order to compensate for this error, one possibility is to report α and β for each pair of base stations, for each RSTD measurement to the UE. The parameter α gives the trend in the relative error of a pair of base stations. The parameter β gives the instantaneous time difference of transmission instances. These parameters give the complete relative clock information between pairs of base stations to the UE. However, for UE based position estimation, the parameter α is redundant, and the parameter β alone suffices for position estimation at UE.

SUMMARY

To support UE-based positioning, PRS are transmitted by base stations, e.g. eNodeB, Transmission-Reception Points (TRP), NR gNB, and assistance data is transmitted by a location server, e.g. an SMLC. The assistance data includes clock parameters to enable the UE to correct the OTDOA calculations due to each base station having a local clock which differs from each other, and from the reference UTC time. One problem with this approach is that a UE can determine local clock values of a base station which may be used to the detriment of the network node.

Solutions are provided to avoid revealing sensitive clock parameter information of a base station to UEs, without degrading the positioning performance in UE-based OTDOA. Some embodiments provide the advantage that only the location server, for example an SMLC or E-SMLC, knows the true local time of the network node (base station). The positioning server only provides OTDOA correction parameters to UEs to UE-based positioning and can then control when it provides such parameters (modified clock parameters) e.g. to subscribed UEs, and/or in response to an authorized request for UE-based positioning assistance data. This has the advantage of increased security of positioning methods as the true clock parameters of the clocks of base stations are not revealed to UEs or any other device. The positioning or location server has control over distribution of the clock parameters in the network. A further advantage is the increased dependency of UEs on the network.

In one aspect a method is performed by a network node for providing positioning reference signals, PRS. The method comprises obtaining offset information relating to the transmission of at least one positioning reference signal. The method further comprises delaying or advancing the transmission of the at least one positioning reference signal in accordance with the received offset information wherein delaying or advancing the transmission according to the offset information shifts the transmission of the at least one positioning reference signal away from a scheduled transmission time for the at least one positioning reference signal transmission.

In another aspect a method is performed by a location server for supporting positioning measurements. The method comprises determining offset information for transmission of a positioning reference signal, PRS, by a network node based on obtained local timing information of said network node, wherein the offset information comprises an instruction to delay or advance the transmission of the positioning reference signal wherein the delay or advance corresponds to a shift to the transmission time of the positioning reference signal away from a scheduled transmission time for said positioning reference signal. The method further comprises sending the determined offset information to the network node.

In a further aspect a method is performed by a wireless device for determining position of the wireless device based on observed time difference of arrival. The method comprises receiving time difference information relating to the difference in transmission of at least a first position reference signal, PRS, scheduled to be transmitted from a first network node as a synchronised PRS transmission with a second PRS transmission from a second network node, wherein the time difference information is computed based on at least the first PRS being shifted away from the scheduled transmission time for said PRS. The method further comprises receiving expiration information corresponding to the time difference information. The method further comprises performing positioning computation based on the received time difference information when the expiration information indicates the time difference information is valid.

In another aspect a network node for providing positioning reference signals, PRS, is provided. The network node comprising processing circuitry and transceiver circuitry. The network node is configured to receive, via the transceiver circuitry offset information relating to the transmission of at least one positioning reference signal. The at least one processor (230) configured to delay or advance the transmission of the at least one positioning reference signal in accordance with the received offset information wherein the offset information shifts the transmission of the first positioning reference signal away from a scheduled transmission time for the at least one positioning reference signal transmission.

In further aspect a location server for supporting positioning measurements is provided. The location server comprising processing circuitry and at least one communications interface. The location server is configured to determine offset information for transmission of a positioning reference signal, PRS, by a network node based on obtained local timing information of said network node, wherein the offset information comprises an instruction to delay or advance the transmission of the positioning reference signal wherein the delay or advance corresponds to a shift to the transmission time of the positioning reference signal away from a scheduled transmission time for said positioning reference signal. The location server is configured to send, via the at least one communications interface, the determined offset information to the network node.

In another aspect a wireless device for determining position of the wireless device based on observed time difference of arrival is provided. The wireless device comprising processing circuitry and transceiver circuitry. The wireless device is configured to receive, via the transceiver circuitry, time difference information relating to the difference in transmission of at least a first position reference signal, PRS, scheduled to be transmitted from a first network node as a synchronised PRS transmission with a second PRS transmission from a second network node, wherein the time difference information is computed based on at least the first PRS being shifted away from the scheduled transmission time for said PRS. The wireless device is further configured to receive, via the transceiver circuitry, expiration information corresponding to the time difference information. The wireless device is configured to perform positioning computation based on the received time difference information when the expiration information indicates the time difference information is valid.

In another aspect a system for performing UE based positioning is provided. The system is configured to determine offset information for transmission of one or more positioning reference signals, PRS, by at least one network node based on obtained local timing information of the at least one network node, wherein the offset information comprises a delay or advance to the transmission of the one or more PRS. The system is further configured to delay or advance the transmission of the one or more PRS in accordance with the determined offset information, wherein the delay or advance corresponds to a shift to the transmission time of the one or more PRS away from a scheduled transmission time for said one or more PRS, wherein each PRS of said one or more PRS transmitted from each at least one network node has a scheduled transmission time which is synchronised with a corresponding PRS scheduled to be transmitted from another network node. The system is further configured to determine time difference information corresponding to a determined time relation between each of the shifted one or more PRS and a time of transmission of the corresponding PRS transmitted from said another network node. The system is further configured to perform positioning computation based on the determined time difference information.

In other aspects computer program or carrier comprising instructions are provided which when executed on a computer causes the computer to perform any one of the aspects disclosed.

In other aspects computer program product in the form or memory comprising instructions is provided which when executed on a computer causes the computer to perform any one of the aspects disclosed.

BRIEF DESCRIPTION OF THE DRAWINGS

FIG. 3 is a block diagram illustrating position reference signaling resources.

FIG. 10 is a flow diagram illustrating one or more embodiments of the present disclosure.

FIGS. 22 to 25 are flowcharts illustrating methods implemented in a communication system including a host computer, a base station and a user equipment.

DETAILED DESCRIPTION

Figure 7:
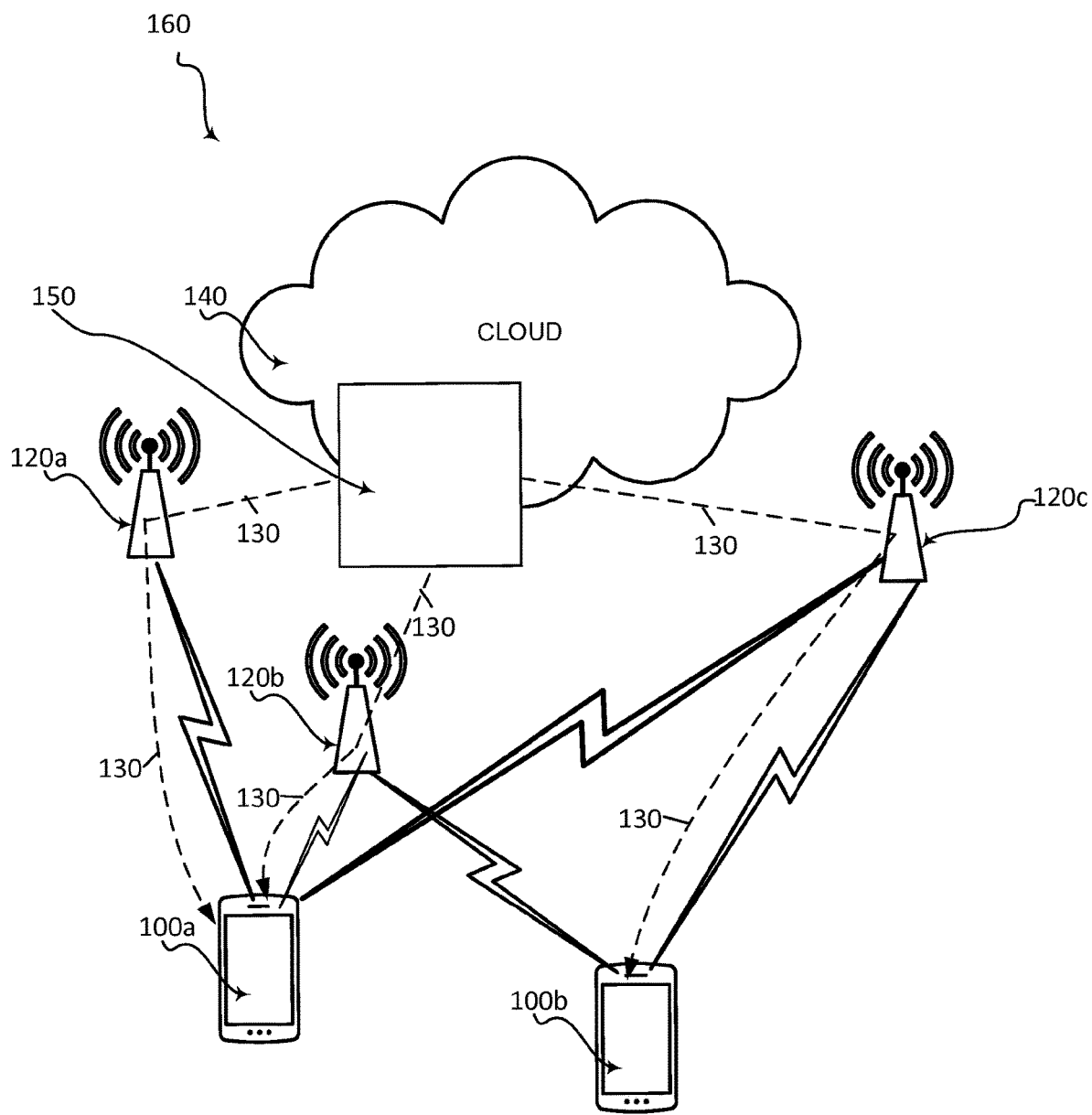
FIG. 7 is an example communications system according to embodiments of the present disclosure.

FIG. 7 depicts a communications system 160 according to embodiments disclosed herein. To support UE-based positioning, PRS are transmitted by network nodes 120a, 120b, 120c (referred to generally as 120) The network nodes may be radio base stations e.g. eNodeB, Transmission-Reception Points (TRP), NR gNB, and assistance data 130 is transmitted by a core network entity 150 such as a positioning server, e.g. an SMLC. The core network entity 150 may alternatively be part of a cloud computing system 140. The assistance data 130 is depicted being transmitted to wireless devices 100a, 100b (referred to generally as 100) via the network nodes 120a, 120b, 120c. The assistance data 130 may be transmitted via only one, serving network node via LPP or may be transmitted via another interface, not shown. The assistance data 130 includes clock parameters to enable the wireless devices 100a, 100b to correct OTDOA calculations due to each base station 120a, 120b, 120c having a local clock which differs from each other, and from the reference UTC time.

When reporting clock parameters for UE-based OTDOA positioning, the following problems exist:
True value of clock parameters of network nodes is passed to the UEs. This can be a security concern. Revealing clock information also reveals signal transmit instances of the base stations in the network, which can be important information for adversaries and jammers to create disturbance and any other disturbances in the network.
Once a UE knows these clock parameters, these clock parameters are valid for a long period due to the linear behaviour of the clocks. The network has less control on these clock parameters, which is undesirable, particularly if positioning is offered as a service to the UE.
There exists no particular mechanism of protecting clock parameters from becoming known outside of an operator's controlled domain (i.e. publicly available without a subscription).

Solutions are provided herein to avoid revealing sensitive clock parameter information of base stations to UEs, without degrading the positioning performance in UE-based OTDOA.

The term "wireless device" or mobile terminal used herein may refer to any type of wireless device communicating with a network node 120 and/or with another wireless device 100 in a cellular or mobile communication system 100. Examples of a wireless device 300 are user equipment (UE), target device, device to device (D2D) wireless device, machine type wireless device or wireless device capable of machine to machine (M2M) communication (such as a telematics unit for installation in a car, truck or unmanned aerial vehicle), PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 120, it is understood that the functions can be performed in other network nodes and network elements. It is also understood that the functions of the network node 120 can be distributed across a network cloud so that other nodes can perform one or more functions or even parts of functions described herein.

In one approach, a discreet time shift is applied to the time of positioning signal transmission at a network node. A wireless device receives a set of modified clock values, for example as part of UE-base positioning assistance data which corresponds to the shifted transmission time of the PRS. When a base station also suffers from local clock drift, the modified clock values correct that error at the same time as correcting the intentionally applied discreet time shift to the PRS. Thus a wireless device receives data which enables the wireless device to determine accurate OTDOA. The UE-based assistance data may be in relation to two neighbour base stations, wherein each base station has a different discreet time shift applied and the assistance data provides the modified clock values in relation to each base station. In other examples the assistance data may correspond to one base station to which a discreet time shift has been applied wherein the assistance data comprises modified clock values for the base station in relation to a reference cell.

In some examples the discreet time shift varies as function of time for a given base station, and the modified clock values provided to a wireless device comprise a function over time to adjust TDOA calculations of a first base station in relation to a reference cell and/or in relation to another neighbour base station. In such an example the other neighbour base station has its PRS transmissions shifted by the same function of time as the first base station or a different function over time as the first base station. As such the time differences between PRS transmissions from each base station become non-linear, preventing the UE from predicting further values.

In one embodiment, a network node/base station receives offset information for transmission of a positioning reference signal. The network node then delays or advances the transmission of the positioning reference signal in accordance with the received first offset information. The offset information shifts the transmission of the first positioning reference signal away from a scheduled transmission time for the first positioning reference signal transmission. The positioning reference signal is scheduled to be transmitted according to specified PRS transmission schedule (see for example Table 1) and would normally, ideally, be transmitted at the same time as other neighbour network node PRS transmissions if transmitted without any intentional discreet time shift being applied. The method applies to each PRS transmission. In some examples the offset information relates to individual PRS transmissions. In other examples the offset information relates to PRS transmission occasions, i.e. a period of PRS transmission.

The above described embodiment provides the advantage that only the positioning server, for example an SMLC or E-SMLC, knows the true local time of the network node (base station). The positioning server only provides OTDOA correction parameters to UEs for UE-based positioning and can then control when it provides such parameters (modified clock parameters) e.g. to subscribed UEs only, and/or in response to an authorized request for UE-based positioning assistance data. This has the advantage of increased security of a positioning method as the true clock parameters of the clocks of base stations are not revealed to UEs or any other device. The positioning or location server has control over distribution of the clock parameters in the network. A further advantage is the increased dependency of UEs on the network. Since the true clock parameters of the base stations may not change so rapidly over time without such discreet time shift a rogue UE could determine the true clock values of a network node, e.g. base station. As a result the network node might be at risk from malicious unsolicited communications.

In some embodiments disclosed herein, the modified clock parameters, whether they correspond to a discreet time shift of the PRS or a function over time, the positioning service network can set an expiry time on these parameters. Upon expiry of the time period or a time-to-live value, the modified clock values will no longer apply. The positioning service network, i.e. the positioning server and/or network nodes involved in providing the positioning reference signals will change the PRS transmission and a UE will require new modified clock parameters (e.g. new function correlating the PRS transmissions) from the location or positioning servers. This provides a further advantage of dependency on the network by the UE and enables, for example, positioning as a service to be controlled over time.

A further advantage with the proposed embodiments is that encryption of the signaling between the positioning server and the UE is not necessary to control the unauthorized obtainment of assistance data for the purpose of determining network node clock values.

The process by which a positioning server, e.g. an SMLC may adapt the clocks of base stations will now be considered in more detail. The outcome being that positioning signals are transmitted at pseudo-random intervals, despite being scheduled to be transmitted at regular intervals and coordinated with other neighbour base stations, for example via a standardized schedule such as shown in Table 1. The solutions disclosed enable sensitive network clock data to be hidden from UEs in UE-based OTDOA without degrading the positioning performance. Solutions disclosed introduce a concept of modifying base station clocks such that the timing relation for positioning signaling between pairs of network nodes does not remain linear or predictable. Modifying base station clocks corresponds to modifying the timing for scheduling PRS signals.

Figure 1:
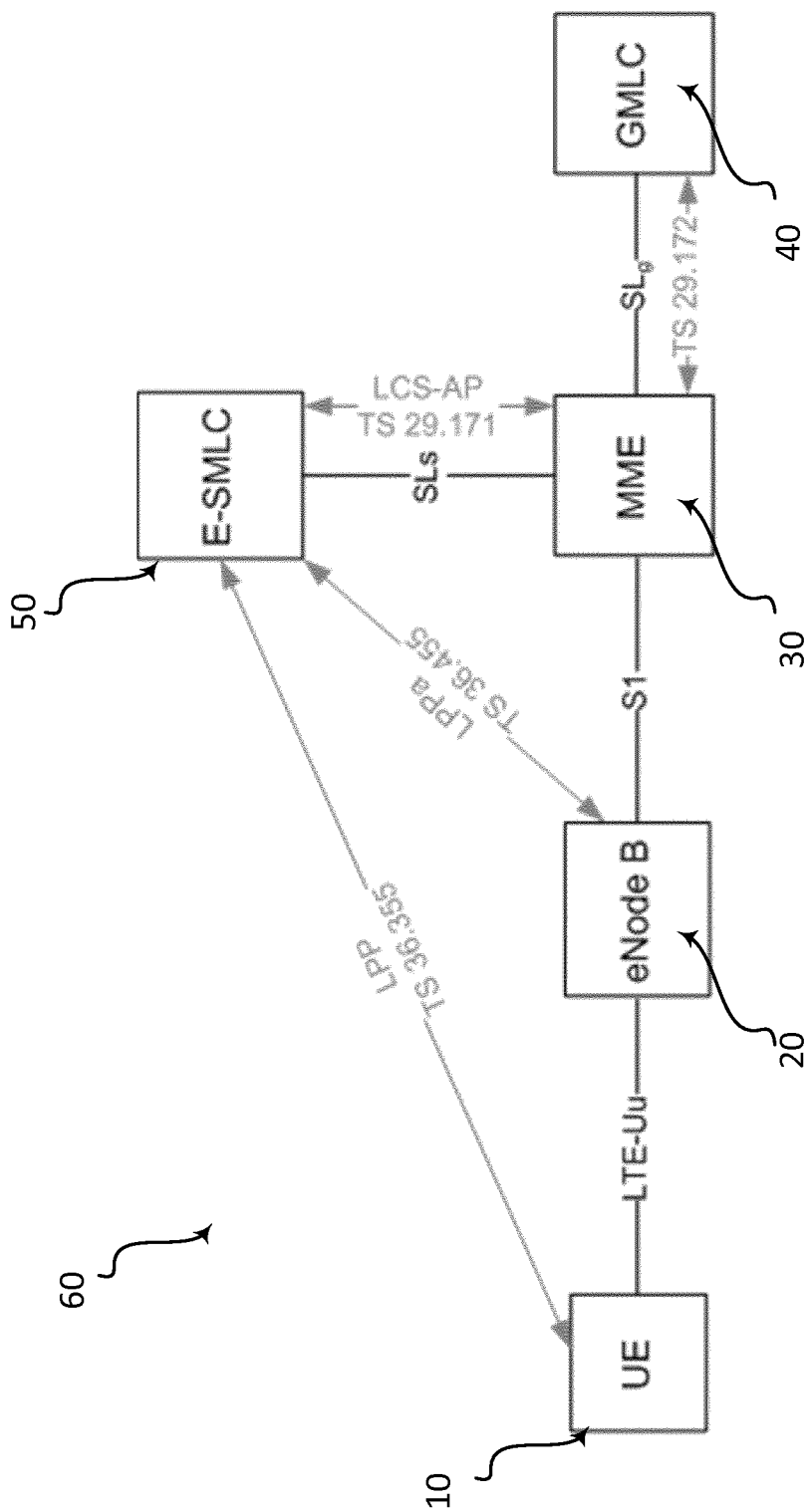
FIG. 1 is a block diagram illustrating positioning architecture.
Figure 2:
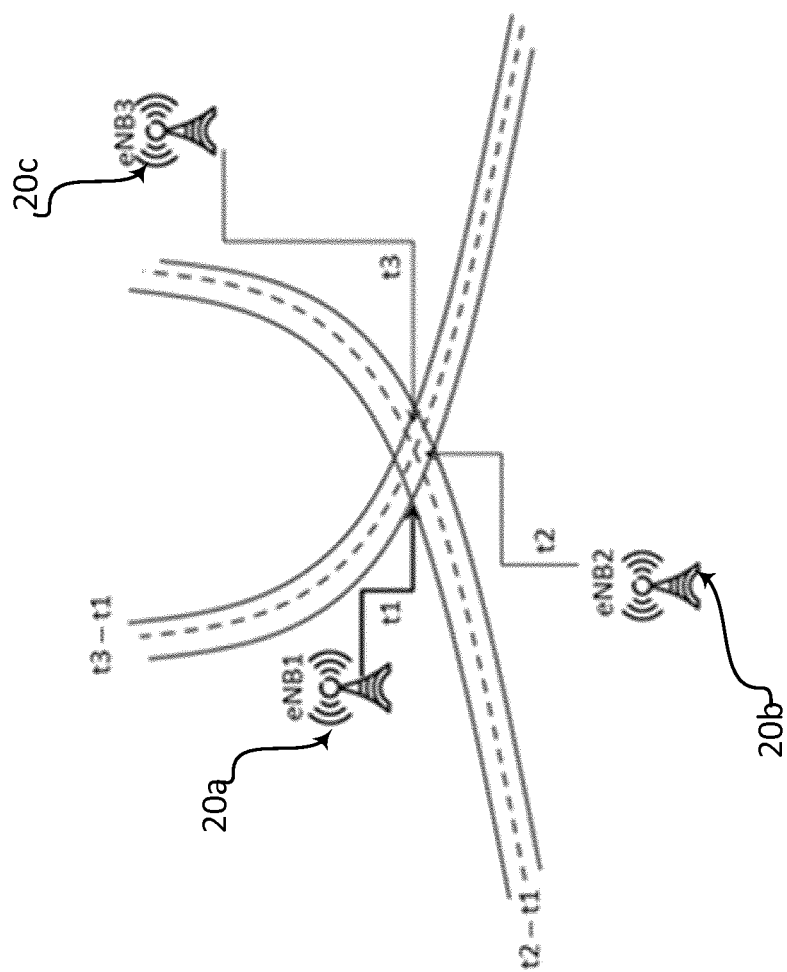
FIG. 2 is a block diagram illustrating OTDOA measurement.
Figure 4:
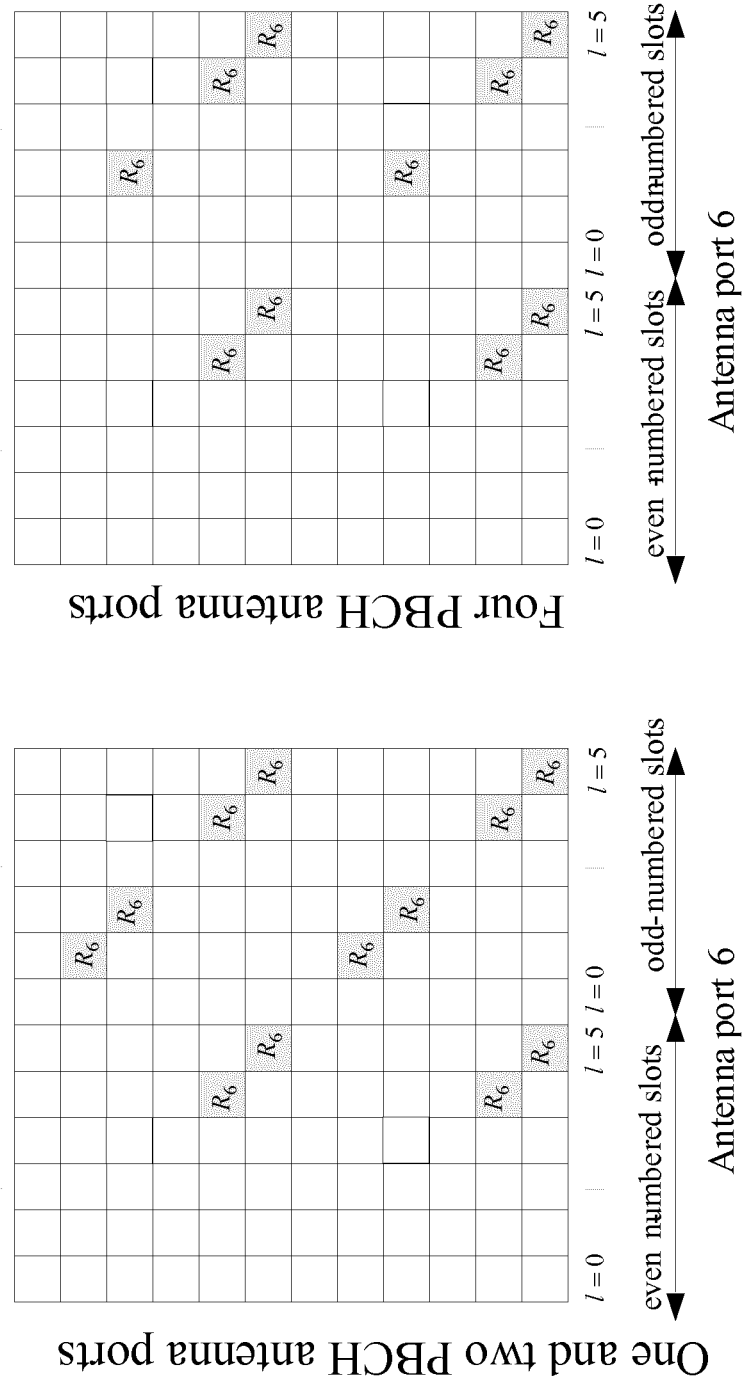
FIG. 4 is a further example block diagram illustrating position reference signaling resources.
Figure 5:
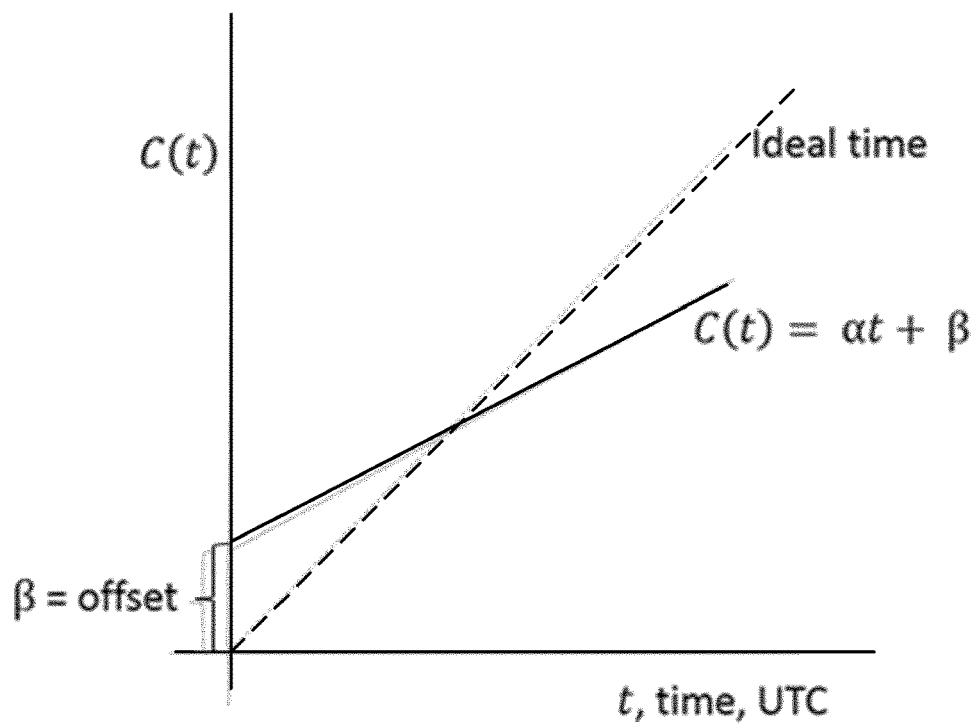
FIG. 5 is a graph depicting a network node clock characteristic in relation to UTC.
Figure 6:
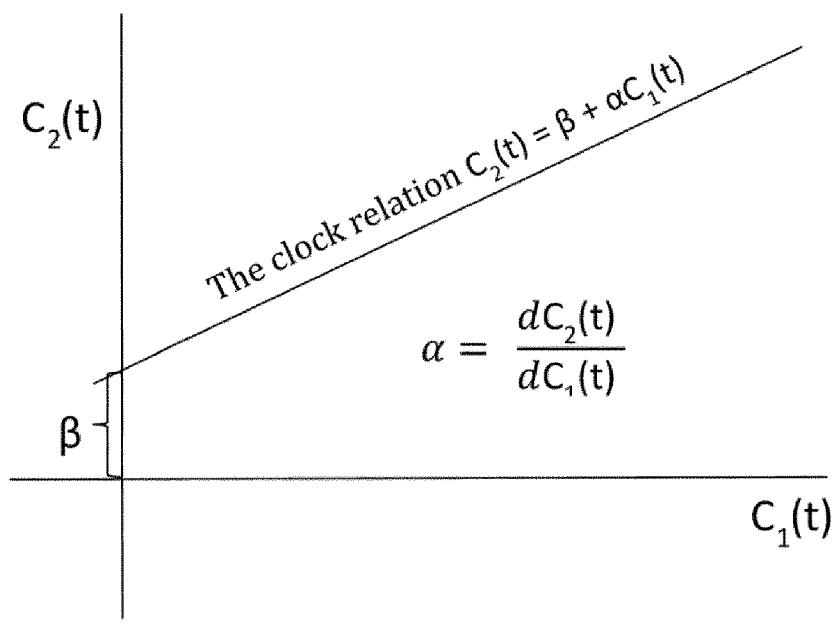
FIG. 6 is a graph depicting a network node clock characteristic in relation to another network node.

In one aspect, timing information is reported to a location or positioning server from each network node in terms of time and clock characteristic of that network node. The positioning server may then derive relative timing information between the network node and another network node, and/or a reference clock/cell. For example the timing information may include, but is not limited to the initial time offset between two clocks at any particular instance and the relative skew between the two clocks. In some examples the time and clock information are reported in relation to a reference clock known at both the location server and the network node. In another example, it will be reported in relation to the time information of some other network node which can be considered as a neighbour node. The network nodes may exchange timing information among themselves through synchronization protocols such as Precision Time Protocol (PTP). The relative timing information among the network nodes is typically linear as shown in FIG. 6, where $C_2(t)$ and $C_1(t)$ are times of network node 2 and 1, respectively.

In another example, the location server, e.g. SMLC, can have a frequent, systematic procedure for getting updates for timing information of each network node. In another example this can be done when an expiration time has been reached. In one aspect a network node may indicate the expiration time to the positioning server. In another aspect the positioning server may provide the expiration time to the network node, e.g base station, which then provides the timing information to the positioning server at the expiration.

When the timing information of the network nodes are updated and valid at the location server, the location server is able to synthesize a new proxy relation between the clocks of the network nodes. The proxy time relations between network nodes are used further by the location server to control the time of signal transmission by the network nodes.

The positioning offset information which is set by the location server and sent to the network nodes can comprise discreet deltas. For example, a format comprising: vector $[\Delta_1, \Delta_2, \Delta_3, \Delta_4 \ldots \Delta_N]$ per network node may be provided. The offsets or deltas $\Delta_1, \Delta_2, \Delta_3, \Delta_4$ correspond to an advance or a delay to the PRS transmission. For example, the advance or delay corresponds to a shift in the transmission of the positioning reference signals away from a scheduled transmission time for a given positioning reference signal. In some embodiments the delta or shift correspond to the PRS occasion where $\Delta_1$ is valid for PRS occasion 1, $\Delta_2$ for PRS occasion 2 etc. These deltas or shifts can be uniformly distributed between zero to an upper limit, which can be based on PRS transmission periodicity, the maximum range of the network (for example the maximum distance from a transmitter that a PRS may be reliably detected, e.g. based on the power level, antenna height etc) and the interference conditions. In other embodiments, $\Delta_1$ is valid for PRS subframe 1, $\Delta_2$ for PRS subframe 2 etc. The modified clock value signaled to the UE could be a vector of values, or in another embodiment, a pseudo random function that is based on parameters reported from the location server.

In summary, the offset information may correspond to actual local times at which the network node is to transmit a single PRS, a whole PRS occasion, a delta to the subframe offsets for PRS scheduling among other possible transmission time shifts to produce the desired advance or delay in transmission of the PRS.

When the offset information comprises a delay delta values of vector, e.g. $[\Delta_1, \Delta_2, \Delta_3, \Delta_4 \ldots \Delta_N]$ the network node may apply the delay value at the time of PRS transmission. As such the delay can then be a function of one or more of following parameters:

UTC time,
PRS subframe number,
PRS occasion.

In some embodiments the offset information may comprise a Gaussian distribution with mean μ (mu) and variance Σ (sigma).

Figure 8:
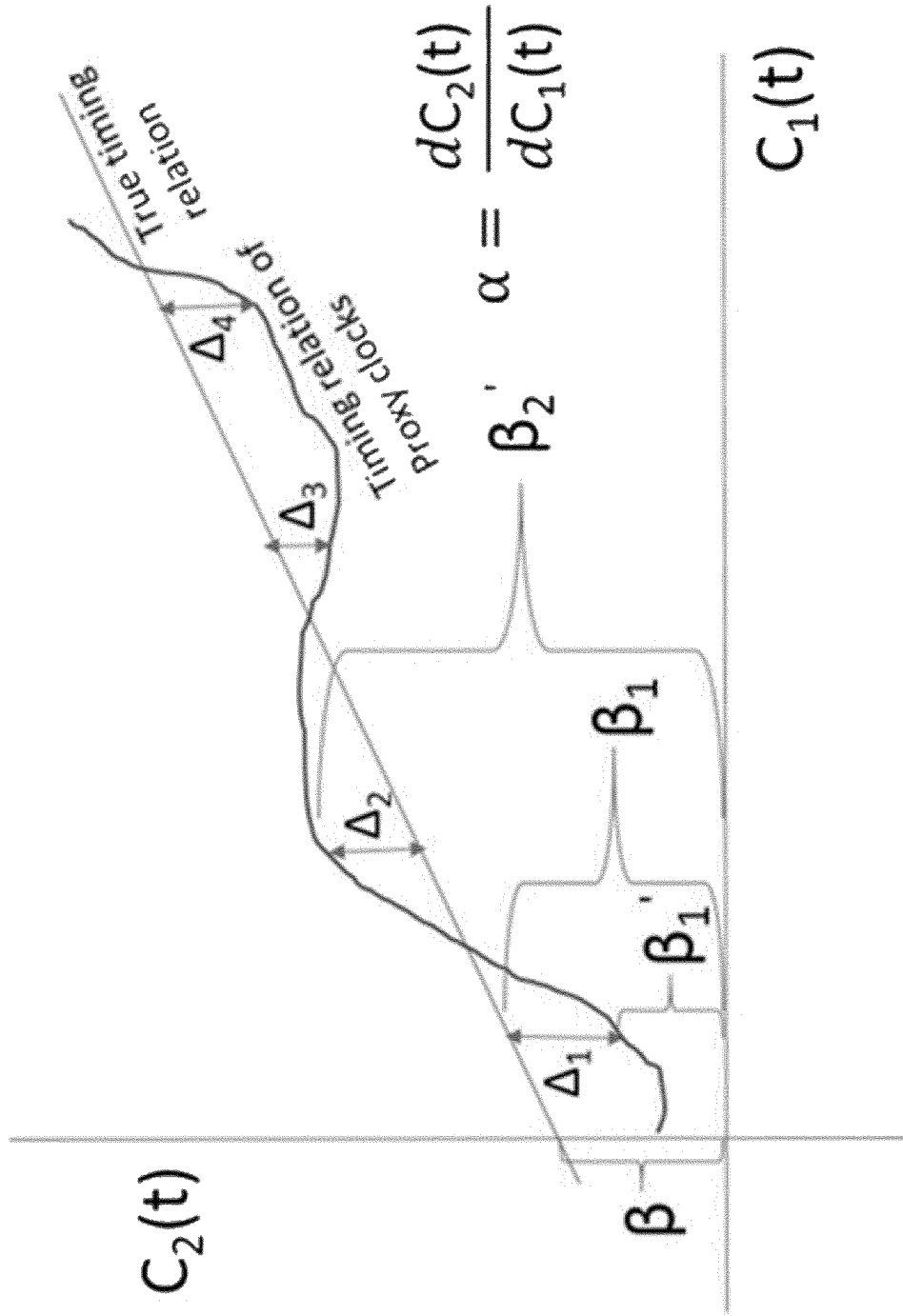
FIG. 8 a graph depicting a network node clock characteristic in relation to another network node clock characteristics according to one or more embodiments of the present disclosure.
Figure 9:
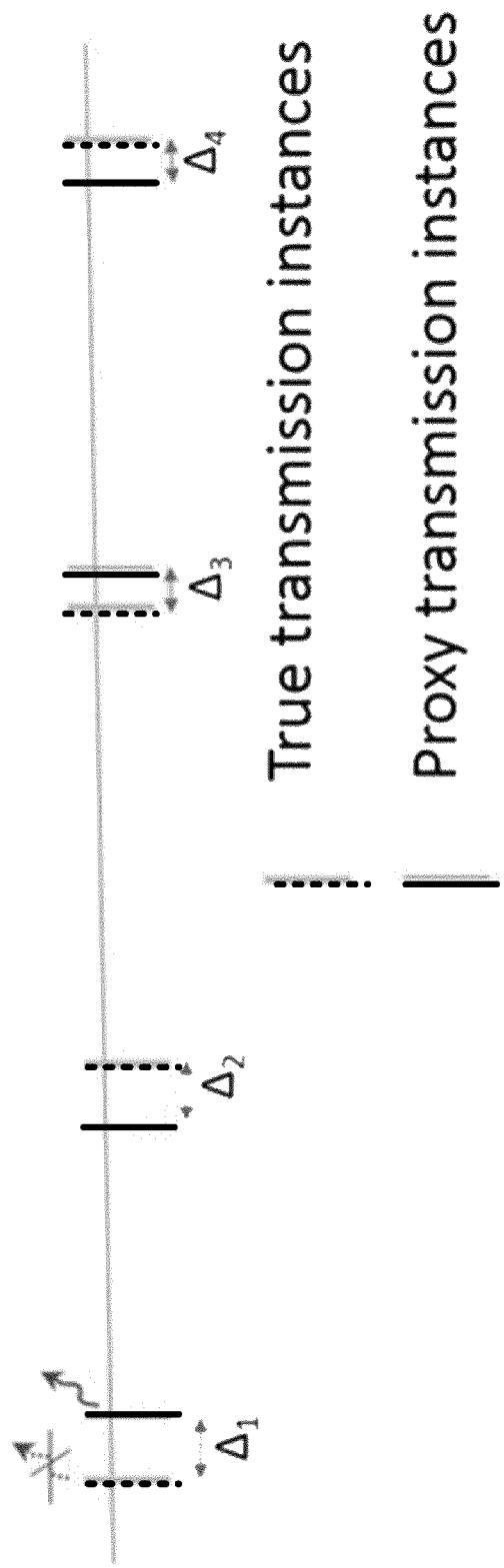
FIG. 9 depicts one or more embodiments according to the present disclosure.

The computation performed by the positioning server based on the new times of transmissions from the network nodes may be modelled as shown in the FIG. 8 The computed relative shifted PRS transmissions from the true time or coordinated scheduled transmission of each PRS, which hereinafter is called 'proxy clock' relation. A new set of betas $[\beta_1', \ldots \beta_N']$ is derived from the proxy clock relation by the positioning server. FIG. 9 shows how the true clock parameters can be hidden by introducing deltas $[\Delta_1, \Delta_2, \Delta_3,$ $\Delta_4 \ldots \Delta_N$] to the true clock. By adding the deltas, a non-linear relation is created between network clocks. Beta values (or information corresponding to them) are required by the UE for computing its own position and comprise assistance data provided to the UE for UE-based positioning, i.e. modified clock parameters. Based on the received modified clock parameters, the UE can estimate the 'time of flight' or time-of-transmission by removing the synch error component. In some examples the modified clock parameters give a corrected time of transmission for the PRS which would be used for each network node. The UE then determines a true time difference of arrival between neighbouring nodes which were scheduled to transmit a PRS according to a coordinated transmission schedule, i.e. the PRS would have been synchronized had the offset information not been applied by the respective network nodes. In other examples the modified clock parameters comprise a correction for the time-difference-of-arrival between a pair of neighbour network nodes. In such a method the UE has less opportunity to determine any individual network node's true clock parameters.

In the above discussion embodiments are presented wherein the positioning server directs the network nodes to transmit PRS with a timing offset calculated based on a synthesized proxy clock. By doing this, the true clock parameters of network nodes are not revealed to the UEs. The UEs requiring assistance information for UE-based positioning may only be provided with time parameters, e.g. [$\beta_1'$, ... $\beta_N'$]. As discussed earlier, the parameter $\alpha$ is redundant for UE to compute its position if the true time difference $\beta$ is known (determined) by the UE.

Other methods of implementing the above concepts may be considered. For example, a simple embodiment can be an offset $\beta'$ per network node (e.g. base station or eNB) while also having a different a' per network node. Instead of having a time offset for every PRS transmission time a deliberate bias to the time offset and bias to the clock skew of every network node is added. This essentially amounts to having a different linear curve relation between a pair of network nodes than the original linear curve.

Encryption of time assistance parameters may assume a linear relation between the clocks. However, having an arbitrary shape relationship between the clocks provides a form of encryption of the PRS time parameters which otherwise would provide correction information to the true clock values of each network node.

In a slot-based system, the positioning signal slots can be altered, while the clock error itself is provided. For example, the allocated resource in time and/or frequency can be altered.

In some examples the location server sends, to the wireless device, expiration information corresponding to the time difference information. The expiration information may comprise a time range when the wireless device or UE can use the modified clock parameters before they are outdated. In other words, how long the UE can use the correction time offset values e.g. [$\beta_1'$, ... $\beta_N'$] before it has changed to $\beta_{N+1}'$. The expiration information could be explicitly given from the set of N received modified clock values (BetaPrimes), where the UE needs more clock assistance data after e.g. the Nth PRS occasions, or Nth PRS subframes. In another embodiment, for example if the delay vector is generated using a pseudo-random function, the expiration time could be given based on:

UTC time—valid for x seconds.
PRS occasions, valid for N positioning occasions.

When the expiration information indicates that the time difference information has expired, the UE would need updated modified clock parameters and possibly updated assistance data.

In some examples, target device, e.g. a wireless device, firstly reports its capability to a location server for supporting UE-based positioning. Capable devices then receive assistance data in order to locate themselves. The assistance data may comprise:

Base station locations, i.e. the location information for base station;
The time differences in transmissions of positioning reference signals (PRS); and
Expiration time of time parameters.

The various embodiments considered above will now be described in more detail with respect to certain Figures.

FIG. 10 depicts a method 700 performed by a network node, e.g. eNodeB or gNB for providing positioning reference signals, PRS. The method begins at step 740 with the network node obtaining offset information relating to the transmission of at least one positioning reference signal. The obtained offset information may be received from a location server or may be received from another network entity. The offset information may relate to multiple individual PRS transmissions or multiple PRS occasions. The method proceeds at step 750 with the network node or base station delaying or advancing the transmission of the at least one positioning reference signal in accordance with the received offset information wherein the offset information shifts the transmission of the at least one positioning reference signal away from a scheduled transmission time for the at least one positioning reference signal transmission. As described above the PRS may be scheduled to be transmitted in certain time-frequency resources allocated via an offset from the subframe. In some examples the offset information received adapts the subframe offset value. In other examples the offset information shifts the resource allocation for the PRS. In other examples the offset information provides an offset from prefixed time instances of transmissions. In some examples the scheduled transmission time of the at least one position reference signal is transmitted from a first network node and has a corresponding scheduled positioning reference signal to be transmitted from a second node. The corresponding scheduled positioning reference signal from the second network node is intended to be synchronised with the at least one positioning reference signal transmitted from the first network node. In some embodiments the scheduled transmission time for the at least one positioning reference signal comprises a first physical resource allocation for the transmission of the at least one positioning reference signal from the first network node and a second network node intended to be synchronised with said first network node is scheduled to transmit a corresponding at least one positioning reference signal in a corresponding second physical resource allocation. The shift away from said scheduled transmission time comprises the first network node transmitting said at least one positioning reference signal in a third physical resource allocation which is different from said first and second physical resource allocation. In some examples of this embodiment the first, second and third physical resource allocations comprise slots or subframes of a time-frequency resource grid and the first and second resource allocations comprise corresponding slots or subframes of the time-frequency resource grid and the third resource allocation comprises different slots or subframes of the time-frequency resource grid compared to the slots or subframes allocated for the first and second resource allocations. In other examples the first, second and third resource allocations comprise PRS occasions and the first and second resource allocations comprise corresponding PRS occasions and the third resource allocation comprises a different PRS occasion to the first and second PRS occasions.

In some embodiments the at least one PRS is transmitted from a first network node and a corresponding PRS is transmitted from a second node, and the PRS are for observed time difference of arrival, OTDOA, positioning measurement.

In further embodiments the offset information comprises a sequence and the network node applies a first offset value in the sequence when computing the time for transmission of the at least one positioning reference signal and applies a second offset value in the sequence when computing the time for transmission of a subsequent positioning reference signal. In some examples the offset information comprises an offset from a system frame number, SFN. The sequence may equally apply to PRS occasions rather than single PRS transmissions, i.e. each subsequent value in the sequence applies to subsequent PRS occasions.

The network node may optionally register 710 at a location server, e.g. SMLC, and provide its position and signal information. Signal information may comprise the PRS subframe offset for example. i.e. the PRS transmission scheduling or periodicity. The network node may optionally receive a request 720 for sending its timing information. The request may be from the location server or from another network node or entity. The method may optionally include the step 730 where the network node sends timing information. In some examples this step comprises sending at least one of: location information of the network node, local clock information and positioning reference signal information. For example the scheduled transmission times of the PRS. The network node may send its timing information to a location server or it may be sent to another network entity such as a positioning application. In some examples the network node receives expiration information corresponding to the offset information. From the network node perspective, the expiration time indicates when the current offset information is valid. If the expiration time indicates that the current offset information is invalid the network node requires updated offset information to apply to subsequent PRS transmission. The network node may request updated offset information. In some examples the network node will received updated offset information periodically and shall not transmit PRS whilst the expiration time indicates the current offset information is invalid.

Figure 11:
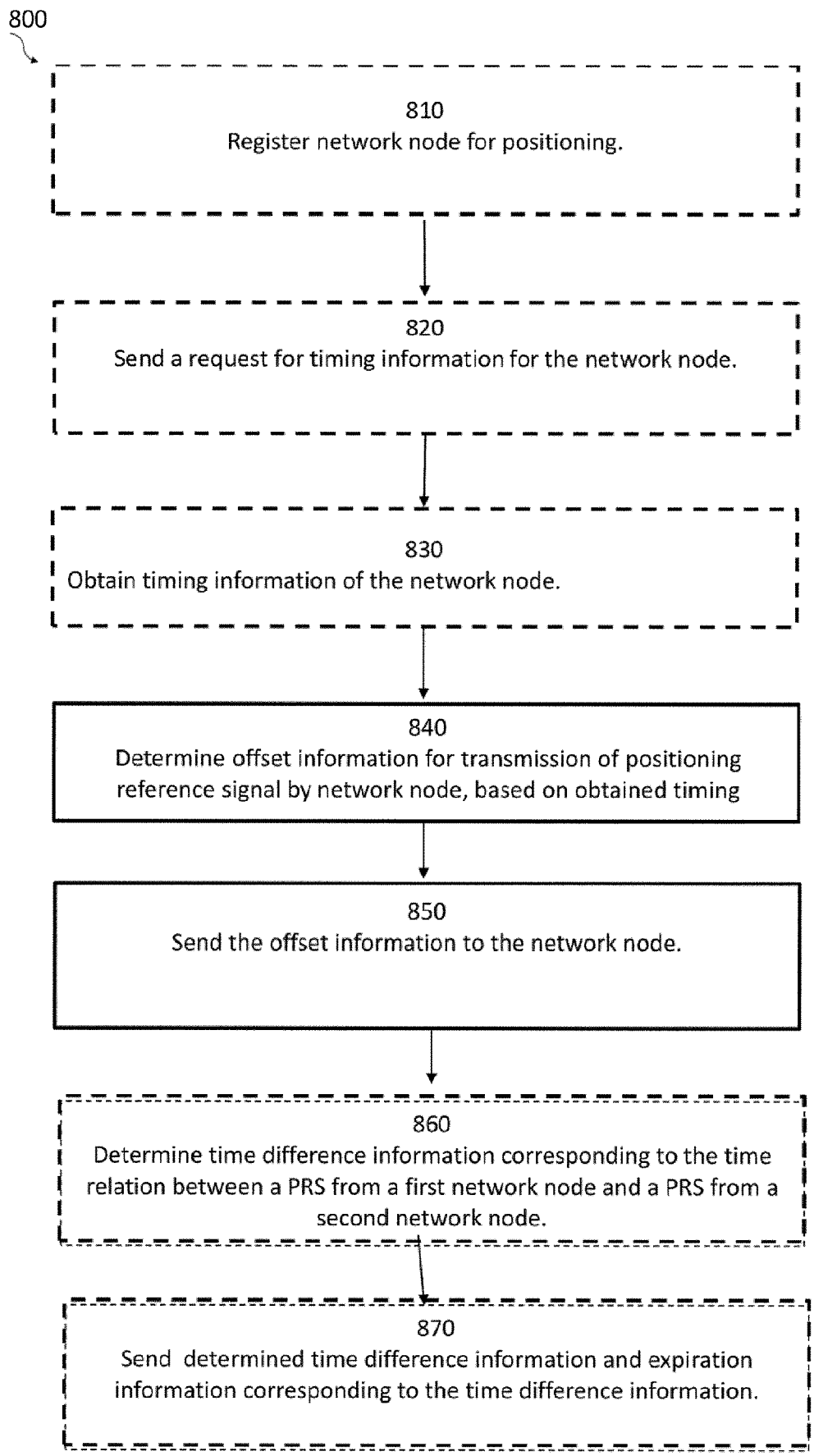
FIG. 11 is a flow diagram illustrating one or more embodiments of the present disclosure.

FIG. 11 depicts a method 800 performed by a location server or positioning server, e.g. E-SMLC, for supporting positioning measurements. The method begins at step 840 with the location server determining offset information for transmission of a positioning reference signal, PRS, by a network node. The offset information is determined based on obtained local timing information of said network node. The offset information comprises an instruction to delay or advance the transmission of the positioning reference signal wherein the delay or advance corresponds to a shift to the transmission time of the positioning reference signal away from a scheduled transmission time for said positioning reference signal. Timing information may comprise the network node's local clock, drift, offset with respect to other neighbour network nodes and/or a reference cell. The timing information may also comprise the positioning reference signaling information, e.g. PRS schedule. In same examples said offset comprises discreet offset values for each PRS occasion or scheduled subframes. In other examples the offset comprises a function over time for a plurality of PRS transmissions. The method proceeds at step 850 with the location server sending the determined offset information to the network node. In some examples said PRS is a first PRS and the scheduled transmission time for the first PRS is synchronised with at least a second PRS scheduled to be transmitted from a second network node. In some embodiments the method, optionally, further comprises determining 860 time difference information corresponding to a time relation between the shifted first PRS and a time of transmission of the second PRS from the second network node. The method may proceed to step 870 with the location server sending the determined time difference information to a wireless device for use in observed time difference of arrival positioning measurement. In some embodiments the location server determines a second offset information for transmission of the second PRS by the second network node based on obtained local timing information of said second network node. The second offset information comprises an instruction to delay or advance the transmission of the second PRS to shift the transmission of the second PRS away from the scheduled transmission time for said second PRS. The location server sends the determined second offset information to the second network node. In this embodiment the determining of the time difference information corresponds to the determining of the time relation between the shifted first PRS and the shifted second PRS. In some examples the time difference information comprises location information and/or the identity of at least the first and second network nodes (for example the GPS position of the base stations and global node identity to uniquely identify the base station); time information indicating the time difference of the transmission of the first PRS and the transmission of the second PRS, wherein the first and second PRS are scheduled to be transmitted as synchronised PRS from the first and second network nodes, respectively. In some examples the time difference information comprises a sequence of time differences. The sequence may equally apply to PRS occasions rather than single PRS transmissions, i.e. each subsequent value in the sequence applies to subsequent PRS occasions. In some examples the location server sends, to the wireless device, expiration information corresponding to the time difference information. In some examples the expiration indication comprises a time value in seconds or an indication of a number of positioning reference signal transmission occasions.

In some examples the location server additionally configures an expiration time for the PRS offset information provided to the network nodes. The expiration time indicates to the network node when the current offset information is valid. If the expiration time indicates that the current offset information is invalid the network node requires updated offset information to apply to subsequent PRS transmission. The location server may receive a request for updated offset information. In some examples the location server sends the offset information periodically. In some examples the network node may be required to (re)-register and/or request the offset information before the location server sends new offset information.

The timing information of a network node may be obtained 820 by the location server, for example by receiving the timing information directly from the network node/base station. In some examples the timing information may be received from another entity, for example a network management entity. In some examples the timing information is requested 810 by the positioning/location server.

In some examples the positioning server or location server may optionally register 810 the network node by obtaining its position and signal information and storing said information for UE-based positioning assistance. The location server may optionally request 820 timing information for the network node. In some examples the location server sends to at least the first network node a request for one of more of: location information of the network node; local clock information; positioning reference signal formation. This information may be provided directly by the network node or it may be provided by another entity, for example a network management node. The location sever receives 830 the timing information of the network node in case of the optional request 820 of the timing information.

Figure 12:
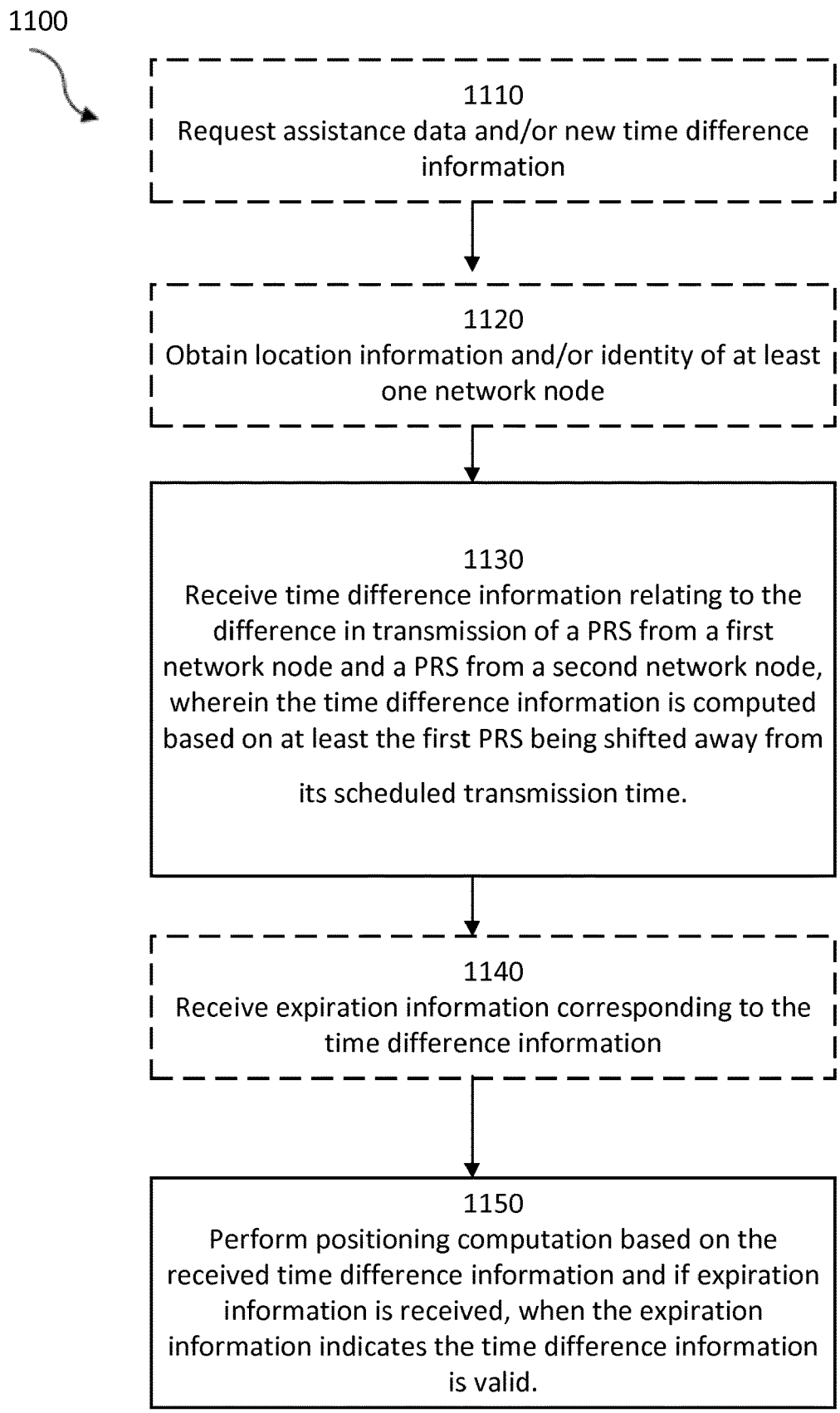
FIG. 12 is a flow diagram illustrating one or more embodiments of the present disclosure.

FIG. 12 describes a method 1100 performed by a wireless device for UE-based positioning, for example based on observed time difference of arrival. The method begins at step 1130 with the wireless device receiving time difference information relating to the difference in transmission of at least a first position reference signal, PRS, scheduled to be transmitted from a first network node as a synchronised PRS transmission with a second PRS transmission from a second network node. The time difference information is computed based on at least the first PRS being shifted away from the scheduled transmission time for said PRS. The wireless device may also receive at step 1140 expiration information corresponding to the time difference information. The expiration information may comprise a time range when the wireless device can use the modified clock parameters before they are outdated. In other words, how long the wireless device can use the correction time offset values e.g. $[\beta_1', \ldots \beta_N']$ before it has changed to $\beta_{N+1}'$. The expiration information could be explicitly given from the set of N received modified clock values (BetaPrimes), where the wireless device needs more clock assistance data after e.g. the Nth PRS occasions, or Nth PRS subframes. The method proceeds at step 1150 with the wireless device performing positioning computation based on the received time difference information. For OTDOA positioning computation the wireless device requires PRS detection from at least two network nodes. In some examples one of the network nodes may represent a reference cell. When the wireless device receives expiration information corresponding to the time difference information the wireless device performs positioning computation when the expiration information indicates the time difference information is valid. When the expiration information indicates that the time difference information has expired, the wireless device would need updated modified clock parameters and possibly updated assistance data.

The wireless device may optionally request 1110 assistance data to support its OTDOA computations. This step may also comprise an authorization for UE-based positioning, e.g. positioning-as-a-service. The request 1110 may be sent to a positioning server, a network node such as a base station/eNodeB or to another entity in the communications system, e.g. an application server or network management entity. In some examples the wireless device may request for assistance data to receive valid time-based data for UE-based positioning from the location server when the expiration information indicates that the time difference information has expired. For example the wireless device would initiate or repeat step 1110.

At step 1120 the wireless device may optionally obtain location information and or identities related to the network nodes or base stations with which it may perform OTDOA based measurements. Such information may be obtained directly from the network nodes, or from the location server or from another network entity such as a application server. The Assistance data obtained at step 1110, may comprise for example, location information and/or identity of at least one network node. This may be received from the network nodes/base stations themselves, via a separate network management entity or as combined assistance data along with the time difference information. In some embodiments the time difference information comprises a sequence of time differences. In some examples the expiration information comprises one a time value in seconds or a number of PRS transmission occasions. In some embodiments the wireless device sends its capability information, for example to indicate that it supports UE-based positioning. In some examples the request for assistance data for time-based UE-based positioning comprises such UE capability information.

Figure 13:
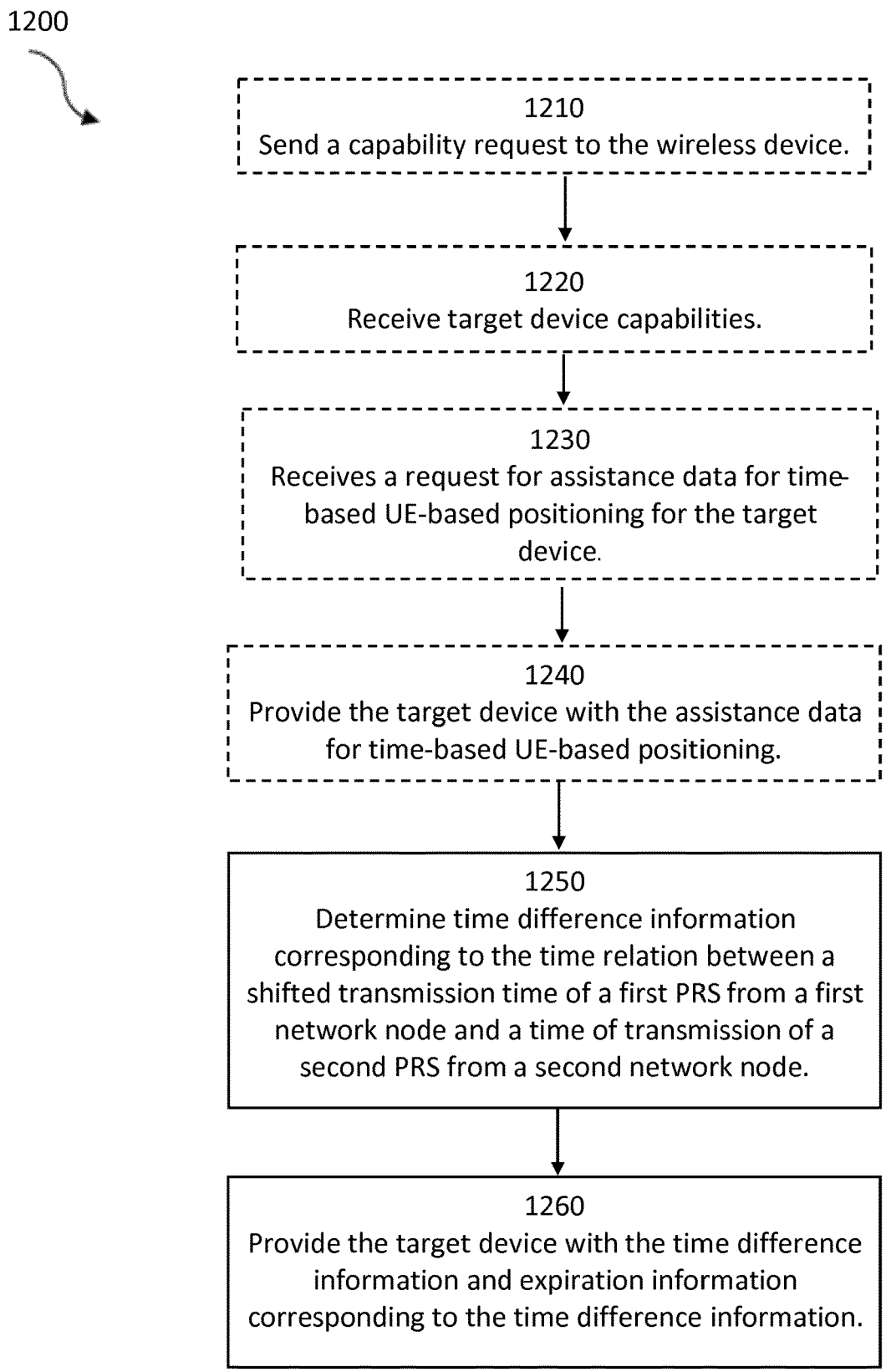
FIG. 13 is a flow diagram illustrating one or more embodiments of the present disclosure.

FIG. 13 shows a method 1200 for supporting UE-based positioning. The method may be performed by a location server (some steps correspond to the same steps described above) or the method may be performed by a network entity which differs from the entity which controls the PRS offset configuration to the network nodes.

The method begins at step 1250 with the network entity determining time difference information corresponding to determining the time relation between a shifted transmission time of a first PRS from a first network node and a time of transmission of a second PRS from a second network node. The method proceeds at step 1260 with the network entity providing the target device with the time difference information and optionally expiration information corresponding to the time difference information. The network entity may optionally send a capability request at step 1210, i.e. prior to providing the time difference information, for example to determine and optionally receive the device capability at step 1220. The network entity may optionally receive a request for timing information assistance data for UE-based positioning at step 1230 from the wireless device. The network entity then provides the wireless device with this assistance information 1240. In some examples the assistance data is provided together with the time difference information and may optionally include this together with an expiration time.

Figure 14:
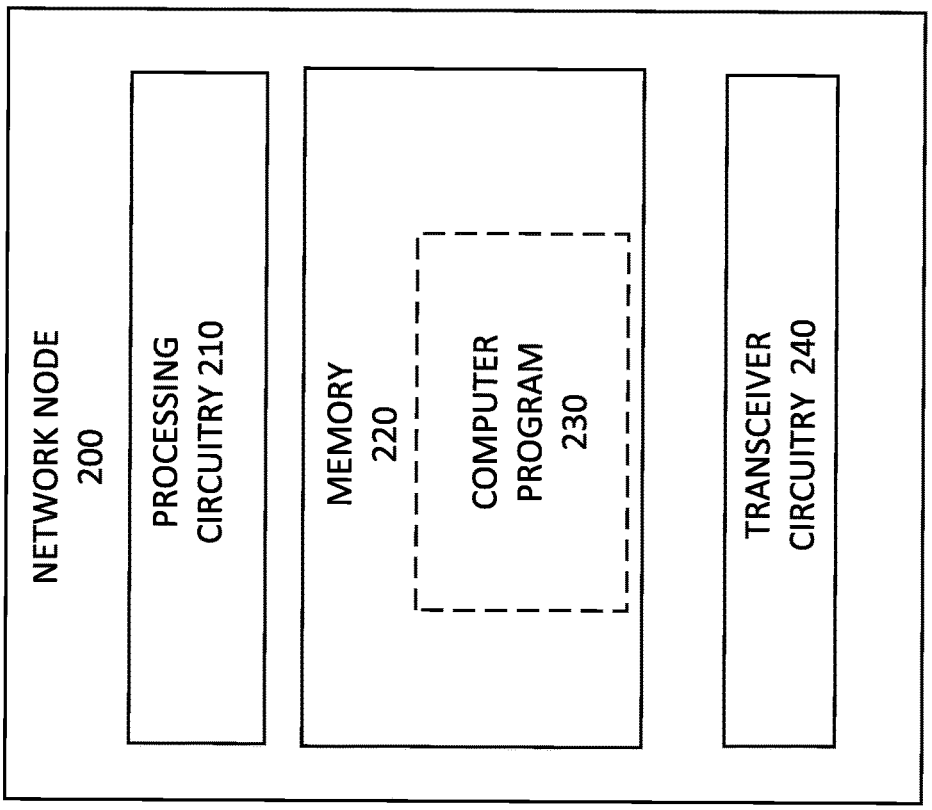
FIG. 14 is a block diagram illustrating an example network node according to one or more embodiments of the present disclosure.

FIG. 14 is a block diagram of the network node 200 constructed in accordance with principles set forth herein. Said network node 200 is suitable for providing positioning reference signals, PRS and, in particular, for adapting the transmission of PRS to hide the local clock information of the network node. The network node 200 is configured to perform any of the methods disclosed herein relevant to a network node. The network node 200 includes processing circuitry 210 which may comprise one or more processors. The network node 200 further comprises and a computer readable storage medium in the form of a memory 220, the memory 220 containing instructions which, when executed by the processing circuitry 210, configures the processing circuitry 210 to perform the one or more methods described herein. The memory 220 may comprise a computer program 230, comprising instructions which, when executed by the processing circuitry 210, configures the processing circuitry 210 to perform the one or more methods described herein In addition or alternatively to a traditional processor and memory, processing circuitry 210 may comprise integrated circuitry for processing and/or control, e.g., one or more processors and/or processor cores and/or FPGAs (Field Programmable Gate Array) and/or ASICs (Application Specific Integrated Circuitry).

Processing circuitry 210 may include and/or be connected to and/or be configured for accessing (e.g., writing to and/or reading from) memory 220, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 220 may be configured to store code executable by control circuitry and/or other data, e.g., data pertaining to communication, e.g., configuration and/or address data of nodes, etc. Processing circuitry 210 may be configured to control any of the methods described herein and/or to cause such methods to be performed. Corresponding instructions may be stored in the memory 220, which may be readable and/or readably connected to the processing circuitry 210. In other words, processing circuitry 210 may include a controller, which may comprise a microprocessor and/or microcontroller and/or FPGA (Field-Programmable Gate Array) device and/or ASIC (Application Specific Integrated Circuit) device. It may be considered that processing circuitry 210 includes or may be connected or connectable to memory, which may be configured to be accessible for reading and/or writing by the controller and/or processing circuitry 210.

The network node 200 also includes transceiver circuitry 240 for transmission and reception over a wireless connection. An example of such transmission for this disclosure is the transmission of positioning reference signaling. An example of such reception for this disclosure is receiving radio resource control signaling from a wireless device. The transceiver circuitry may include a number of antennas suitable for wireless connectivity with one or more radio access types, e.g. LTE, NR.

In some embodiments the network node 200 is configured to receive, via the transceiver circuitry 240, offset information relating to the transmission of at least one positioning reference signal. The network node 200 is further configured, for example via instructions stored in memory 220 and executed on the at least one processor 230 to delay or advance the transmission of the at least one positioning reference signal in accordance with the received offset information wherein the offset information shifts the transmission of the first positioning reference signal away from a scheduled transmission time for the at least one positioning reference signal transmission. In some examples the scheduled transmission time of the at least one position reference signal is scheduled to be transmitted from a first network node 200 and has a corresponding scheduled positioning reference signal in a second network node, e.g. a neighbour node, and the corresponding scheduled positioning reference signal scheduled to be transmitted from the first network node is intended to be synchronised with the at least one positioning reference signal scheduled to be transmitted from the second network node. In some embodiments the processing circuitry 210 is configured to perform resource allocation for PRS transmission and adapt the resource allocation based on the received offset information. For example, the scheduled transmission time for the at least one positioning reference signal comprises a first physical resource allocation for the transmission of the at least one positioning reference signal and a second network node synchronised with said network node is scheduled to transmit a corresponding at least one positioning reference signal in a corresponding second physical resource allocation and wherein the shift away from said scheduled transmission time comprises the network node transmitting said at least one positioning reference signal in a third physical resource allocation which is different from said first and second physical resource allocation. In some examples the first, second and third physical resource allocations comprise slots or subframes of a time-frequency resource grid and wherein the first and second resource allocations comprise corresponding slots or subframes of the time-frequency resource grid and the third resource allocation comprises different slots or subframes of the time-frequency resource grid compared to the slots or subframes allocated for the first and second resource allocations. In other examples the first, second and third resource allocations comprise PRS occasions and wherein the first and second resource allocations comprise corresponding PRS occasions and the third resource allocation comprises a different PRS occasion to the first and second PRS occasions. In some embodiments the at least one PRS is transmitted via the transceiver circuitry 240 from the network node 200 and a corresponding PRS is transmitted from a second node, and the PRS are for observed time difference of arrival, OTDOA, positioning measurement. In some embodiments the offset information comprises a sequence and the processing circuitry 210 applies a first offset value in the sequence when computing the time for transmission of the at least one positioning reference signal and applies a second offset value in the sequence when computing the time for transmission of a subsequent positioning reference signal. In some examples the offset information comprises an offset from a system frame number, SFN. In some embodiments the transceiver circuitry 240 further configured to send at least one of: location information of the network node, local clock information and positioning reference signal information.

Figure 15:
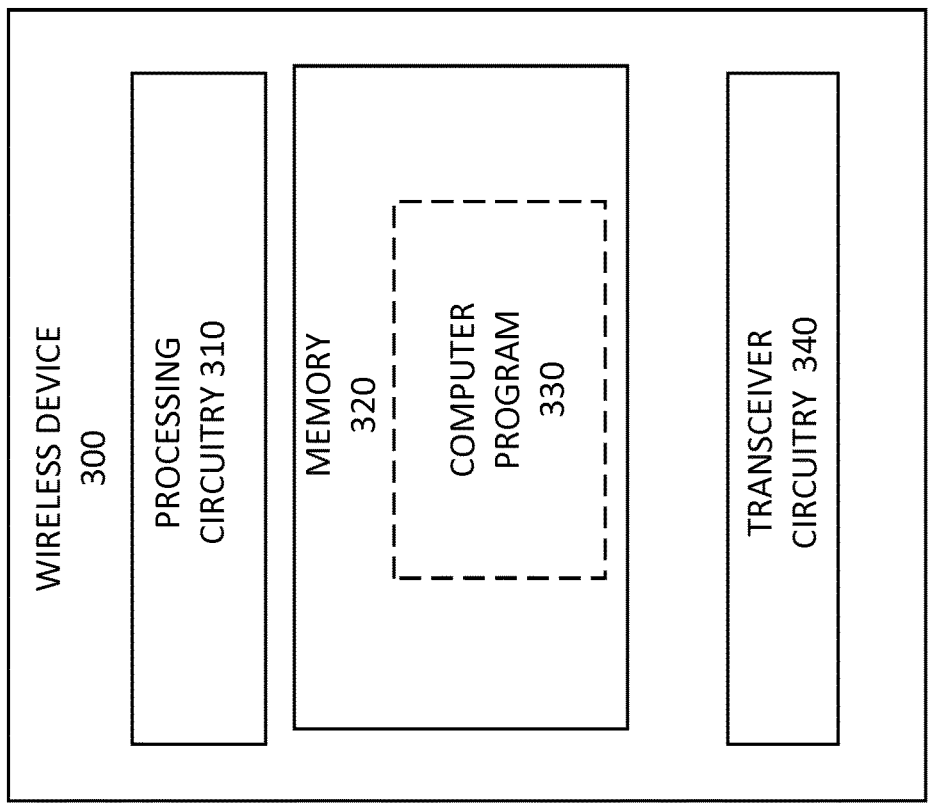
FIG. 15 is a block diagram illustrating an example wireless device according to one or more embodiments of the present disclosure.

FIG. 15 is a block diagram of a wireless device 300 constructed in accordance with principles set forth herein. Said wireless device 300 is suitable for determining position based on observed time difference of arrival. The wireless device 300 is configured to perform any of the methods disclosed herein relevant to a wireless device. The wireless device 300 includes processing circuitry 310 which may comprise one or more processors The wireless device 300 further comprises a computer readable storage medium in the form of a memory 320, the memory 320 containing instructions which, when executed by the processing circuitry 310, configures the processing circuitry 310 to perform the one or more methods described herein. The memory 320 may comprise a computer program 330, comprising instructions which, when executed by the processing circuitry 310, configures the processing circuitry 310 to perform the one or more methods described herein In addition or alternatively to a traditional processor and memory, processing circuitry 310 may comprise integrated circuitry for processing and/or control, e.g., one or more processors and/or processor cores and/or FPGAs (Field Programmable Gate Array) and/or ASICs (Application Specific Integrated Circuitry).

Processing circuitry 310 may include and/or be connected to and/or be configured for accessing (e.g., writing to and/or reading from) memory 320, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 320 may be configured to store code executable by control circuitry and/or other data, e.g., data pertaining to communication, e.g., configuration and/or address data of nodes, etc. Processing circuitry 310 may be configured to control any of the methods described herein and/or to cause such methods to be performed. Corresponding instructions may be stored in the memory 320, which may be readable and/or readably connected to the processing circuitry 310. In other words, processing circuitry 310 may include a controller, which may comprise a microprocessor and/or microcontroller and/or FPGA (Field-Programmable Gate Array) device and/or ASIC (Application Specific Integrated Circuit) device. It may be considered that processing circuitry 310 includes or may be connected or connectable to memory, which may be configured to be accessible for reading and/or writing by the controller and/or processing circuitry 310.

The wireless device 300 also includes transceiver circuitry 340 for transmission and reception over a wireless connection. Examples of such reception for this disclosure is the reception of positioning reference signaling and reception of time difference information. An example of such transmission for this disclosure is transmission of radio resource control signaling and LPP messages such as requests for assistance information. The transceiver circuitry may include a number of antennas suitable for wireless connectivity with one or more radio access types, e.g. LTE, NR, WiFi.

In some embodiments the wireless device 300 is configured to receive, via the transceiver circuitry 340 time difference information relating to the difference in transmission of at least a first position reference signal, PRS, scheduled to be transmitted from a first network node as a synchronised PRS transmission with a second PRS transmission from a second network node, wherein the time difference information is computed based on at least the first PRS being shifted away from the scheduled transmission time for said PRS. In some examples the transceiver circuitry 340 is further configured to receive expiration information corresponding to the time difference information. The wireless device is further configured, for example via instructions stored in memory 320 and executed by at least one processor 330 to perform positioning computation based on the received time difference information. When the wireless device 300 has received expiration information the processing circuitry 310 is configured to perform positioning computation based on the received time difference information only when the expiration information indicates the time difference information is valid. In some examples the time difference information comprises a sequence of time differences. In some examples the expiration information comprises a time value in seconds or an indication of a number of PRS transmission occasions. In some embodiments the transceiver circuitry 340 further configured to send a request for new time difference information when the expiration information indicates the previously received timing difference information is invalid. In another aspect the transceiver circuitry 340 further configured to send at least one of: capability information and a request for assistance data for time-based UE-based positioning.

Figure 16:
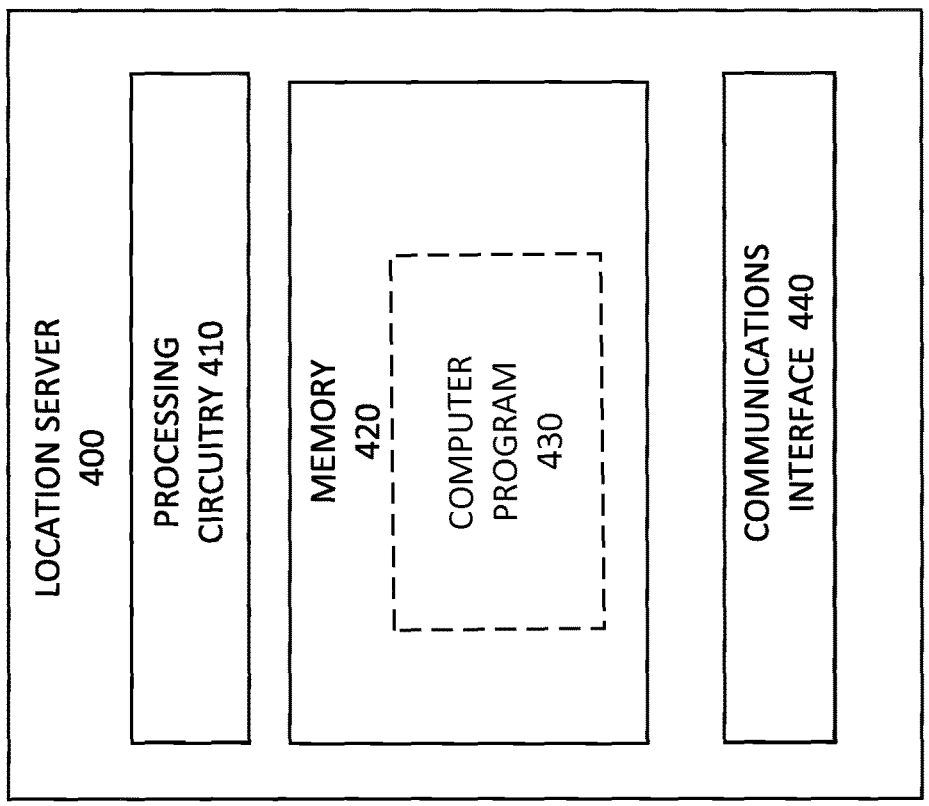
FIG. 16 is a block diagram illustrating an example location or positioning server according to one or more embodiments of the present disclosure.

FIG. 16 is a block diagram of a location server 400 constructed in accordance with principles set forth herein. Said location server 400 is suitable for supporting positioning measurements and, in particular, for adapting the transmission of PRS by network nodes to hide the local clock information of said network nodes. The location server 400 is configured to perform any of the methods disclosed herein relevant to a location server. The location server 400 includes processing circuitry 410 which may comprise one or more processors. The location server 400 further comprises computer readable storage medium in the form of a memory 420, the memory 420 containing instructions which, when executed by the processing circuitry 310, configures the processing circuitry 410 to perform the one or more methods described herein. The memory 420 may comprise a computer program 430, comprising instructions which, when executed by the processing circuitry 410, configures the processing circuitry 410 to perform the one or more methods described herein In addition or alternatively to a traditional processor and memory, processing circuitry 410 may comprise integrated circuitry for processing and/or control, e.g., one or more processors and/or processor cores and/or FPGAs (Field Programmable Gate Array) and/or ASICs (Application Specific Integrated Circuitry).

Processing circuitry 410 may include and/or be connected to and/or be configured for accessing (e.g., writing to and/or reading from) memory 420, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 420 may be configured to store code executable by control circuitry and/or other data, e.g., data pertaining to communication, e.g., configuration and/or address data of nodes, etc. Processing circuitry 410 may be configured to control any of the methods described herein and/or to cause such methods to be performed. Corresponding instructions may be stored in the memory 420, which may be readable and/or readably connected to the processing circuitry 410. In other words, processing circuitry 410 may include a controller, which may comprise a microprocessor and/or microcontroller and/or FPGA (Field-Programmable Gate Array) device and/or ASIC (Application Specific Integrated Circuit) device. It may be considered that processing circuitry 410 includes or may be connected or connectable to memory, which may be configured to be accessible for reading and/or writing by the controller and/or processing circuitry 410.

The location server 400 also includes one or more communications interface 440 for communicating with other entities in the communications system 160, for example to a network node 200. Communications with a wireless device 300 via LPP is piggybacked over the radio interface to a network node 200. In such cases the location server may receive messages from a wireless device 300 via a network node 200. In some examples the location server 400 may receive messages from the wireless device 300 via another network entity, for example via an application to which a user of the wireless device has subscribed, e.g. a UE based positioning application hosted by an Application Server.

In some embodiments the location server 400 is configured to, for example through instructions stored in memory 420 and executed on at least one processor of the processing circuitry 410, determine offset information for transmission of a positioning reference signal, PRS, by a network node based on obtained local timing information of said network node, wherein the offset information comprises an instruction to delay or advance the transmission of the positioning reference signal wherein the delay or advance corresponds to a shift to the transmission time of the positioning reference signal away from a scheduled transmission time for said positioning reference signal. The location server is further configured to send, via the at least one communications interface 240 the determined offset information to the network node. In some embodiments the PRS is a first PRS and the scheduled transmission time for the first PRS is synchronised with at least a second PRS scheduled to be transmitted from a second network node. In further examples of the above aspect, the at least one processor 430 is configured to determine time difference information corresponding to a determined time relation between the shifted first PRS and a time of transmission of the second PRS from the second network node and the at least one communications interface 440 is configured to send the determined time difference information to a wireless device 300 for use in observed time difference of arrival positioning measurement. In another embodiment the processing circuitry is further configured to determine a second offset information for transmission of the second PRS by the second network node based on obtained local timing information of said second network node, wherein the second offset information comprises an instruction to delay or advance the transmission of the second PRS to shift the transmission of the second PRS away from the scheduled transmission time for said second PRS and send via the at least one communications interface 440 the determined second offset information to the second network node. In this aspect the determined time information corresponds to the determined time relation between the shifted first PRS and the shifted second PRS. In some examples the time difference information comprises location information and/or identity of at least the first and second network nodes; and/or time information indicating the time difference of the transmission of the first PRS and the transmission of the second PRS, wherein the first and second PRS are scheduled to be transmitted as synchronised PRS from the first and second network nodes, respectively. In some examples the time difference information comprises a sequence of time differences. In some embodiments the at least one communications interface 440 further configured to send, to the wireless device, expiration information corresponding to the time difference information. In some examples of this aspect, the expiration information comprises one of a time value in seconds and an indication of a number of positioning reference signal transmission occasions. In some further embodiments the at least one communications interface 440 further configured to send to at least the first network node a request for one of more of: location information of said network node, local clock information and positioning reference signal information.

In some embodiments a system 160 is provided for performing UE based positioning, the system configured to determine offset information for transmission of one or more positioning reference signals, PRS, by at least one network node based on obtained local timing information of the at least one network node, wherein the offset information comprises a delay or advance to the transmission of the one or more PRS and delay or advance the transmission of the one or more PRS in accordance with the determined offset information, wherein the delay or advance corresponds to a shift to the transmission time of the one or more PRS away from a scheduled transmission time for said one or more PRS, wherein each PRS of said one or more PRS transmitted from each at least one network node has a scheduled transmission time which is synchronised with a corresponding PRS scheduled to be transmitted from another network node. The system is further configured to determine time difference information corresponding to a determined time relation between each of the shifted one or more PRS and a time of transmission of the corresponding PRS transmitted from said another network node and perform positioning computation based on the determined time difference information.

Figure 17:
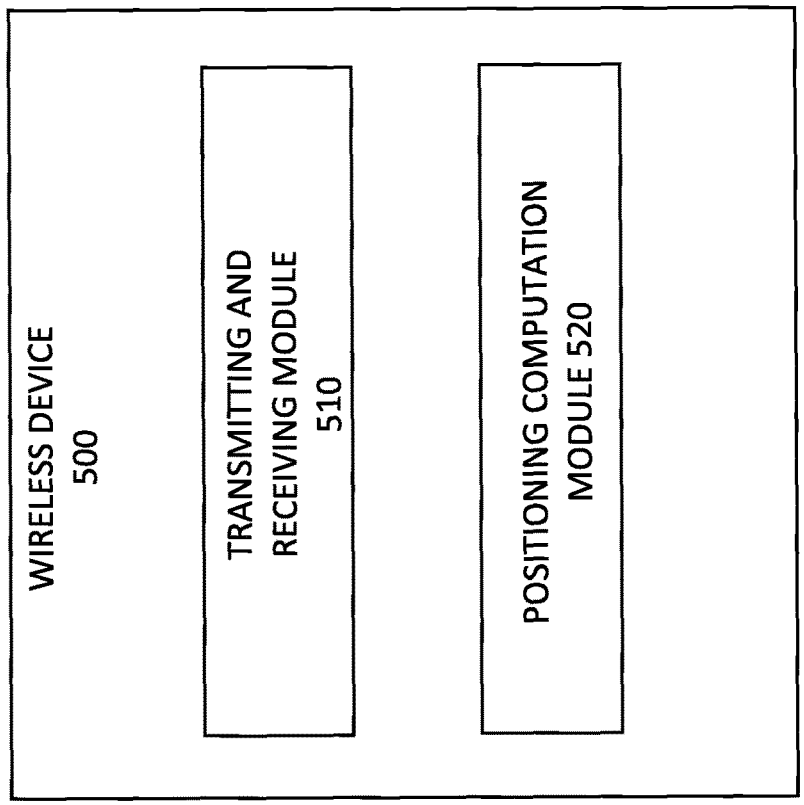
FIG. 17 is a block diagram illustrating an example wireless device comprising software modules according to one or more embodiments of the present disclosure.

FIG. 17 is a block diagram of an alternative embodiment of a wireless device 500 suitable for determining position based on observed time difference of arrival. The wireless device 500 is configured to perform any of the methods disclosed herein relevant to a wireless device. The wireless device 500 may comprise function modules configured to execute one or more of the methods described herein, for example according to computer readable instructions received from a computer program. It will be understood that the modules may be software implemented functional units, and may be realised in any appropriate combination of software. For example, the transmitting and receiving module 510 comprises instructions to receive time difference information relating to the difference in transmission of at least a first position reference signal, PRS, scheduled to be transmitted from a first network node as a synchronised PRS transmission with a second PRS transmission from a second network node, wherein the time difference information is computed based on at least the first PRS being shifted away from the scheduled transmission time for said PRS. In some embodiments the transmitting and receiving module 510 further comprises instructions for receiving expiration information corresponding to the time difference information. The positioning computation module 520 comprises instructions for performing positioning computation based on the received time difference information. When the expiration information is received the positioning computation module 520 comprises instructions for performing positioning computation based on the received time difference information only when the expiration information indicates the time difference information is valid.

Figure 18:
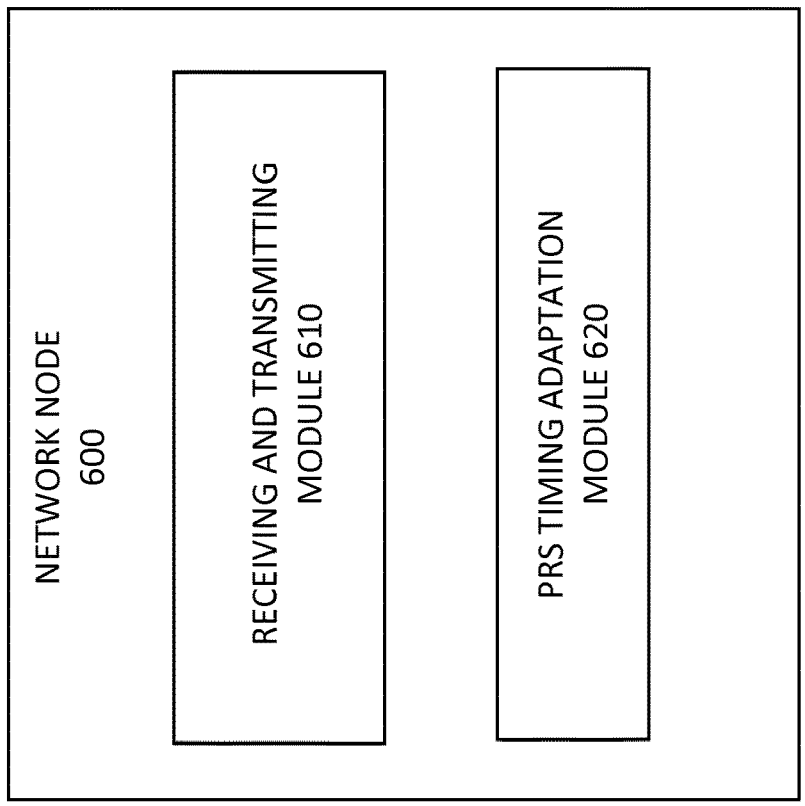
FIG. 18 is a block diagram illustrating an example network node comprising software modules according to one or more embodiments of the present disclosure.

FIG. 18 is a block diagram of an alternative embodiment of a network node 600 suitable for providing positioning reference signal, PRS and, in particular, for adapting the transmission of PRS to hide the local clock information of the network node The network node 600 is configured to perform any of the methods disclosed herein relevant to a network node. The network node 600 may comprise function modules configured to execute one or more of the methods described herein, for example according to computer readable instructions received from a computer program. It will be understood that the modules may be software implemented functional units and may be realised in any appropriate combination of software. For example, the receiving and transmitting module 610 comprises instructions for obtaining offset information relating to the transmission of at least one positioning reference signal. The PRS timing adaptation module 610 comprises instructions for delaying or advancing the transmission of the at least one positioning reference signal in accordance with the received offset information wherein the offset information shifts the transmission of the at least one positioning reference signal away from a scheduled transmission time for the at least one positioning reference signal transmission.

Figure 19:
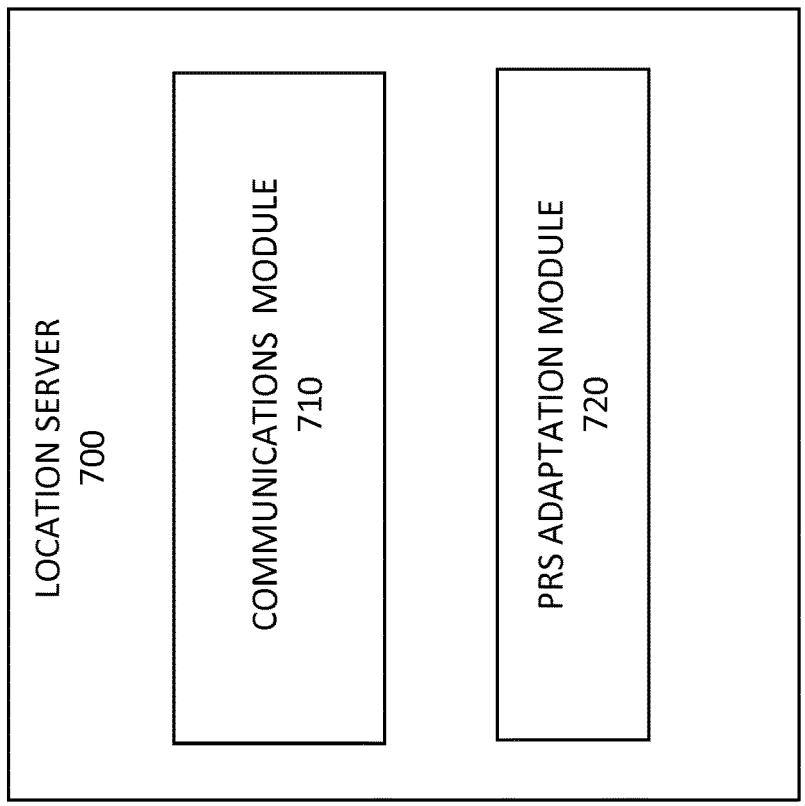
FIG. 19 is a block diagram illustrating an example location or positioning server comprising software modules according to one or more embodiments of the present disclosure.

FIG. 19 is a block diagram of an alternative embodiment of a location server suitable for supporting positioning measurements and, in particular, for adapting the transmission of PRS by network nodes to hide the local clock information of said network nodes. The location server 700 is configured to perform any of the methods disclosed herein relevant to a location server. The location server 700 may comprise function modules configured to execute one or more of the methods described herein, for example according to computer readable instructions received from a computer program. It will be understood that the modules may be software implemented functional units and may be realised in any appropriate combination of software. For example, the PRS adaptation module 720 comprises instructions for determining offset information for transmission of a positioning reference signal, PRS, by a network node based on obtained local timing information of said network node, wherein the offset information comprises an instruction to delay or advance the transmission of the positioning reference signal wherein the delay or advance corresponds to a shift to the transmission time of the positioning reference signal away from a scheduled transmission time for said positioning reference signal. The communications module 710 comprises instructions for sending the determined offset information to the network node.

An aspect provides a computer program 230, 330, 430 for UE based positioning, the computer program comprising computer code which, when run on processing circuitry of a network node 200, wireless device 300, or location server 400 in a communications system 160, causes the network node 200, wireless device 300, or location server 400 perform methods as described herein pertaining to the network node 200, wireless device 300, or location server 400, respectively.

A further aspect of the disclosure provides a carrier containing a computer program comprising instructions which, when executed on at least one processor, cause the node to carry out the method according to any example.

Another aspect provides a computer program product in the form of memory 220, 320, 420 comprising instructions which when executed on a computer causes the computer to perform any one of the methods disclosed herein.

Figure 20:
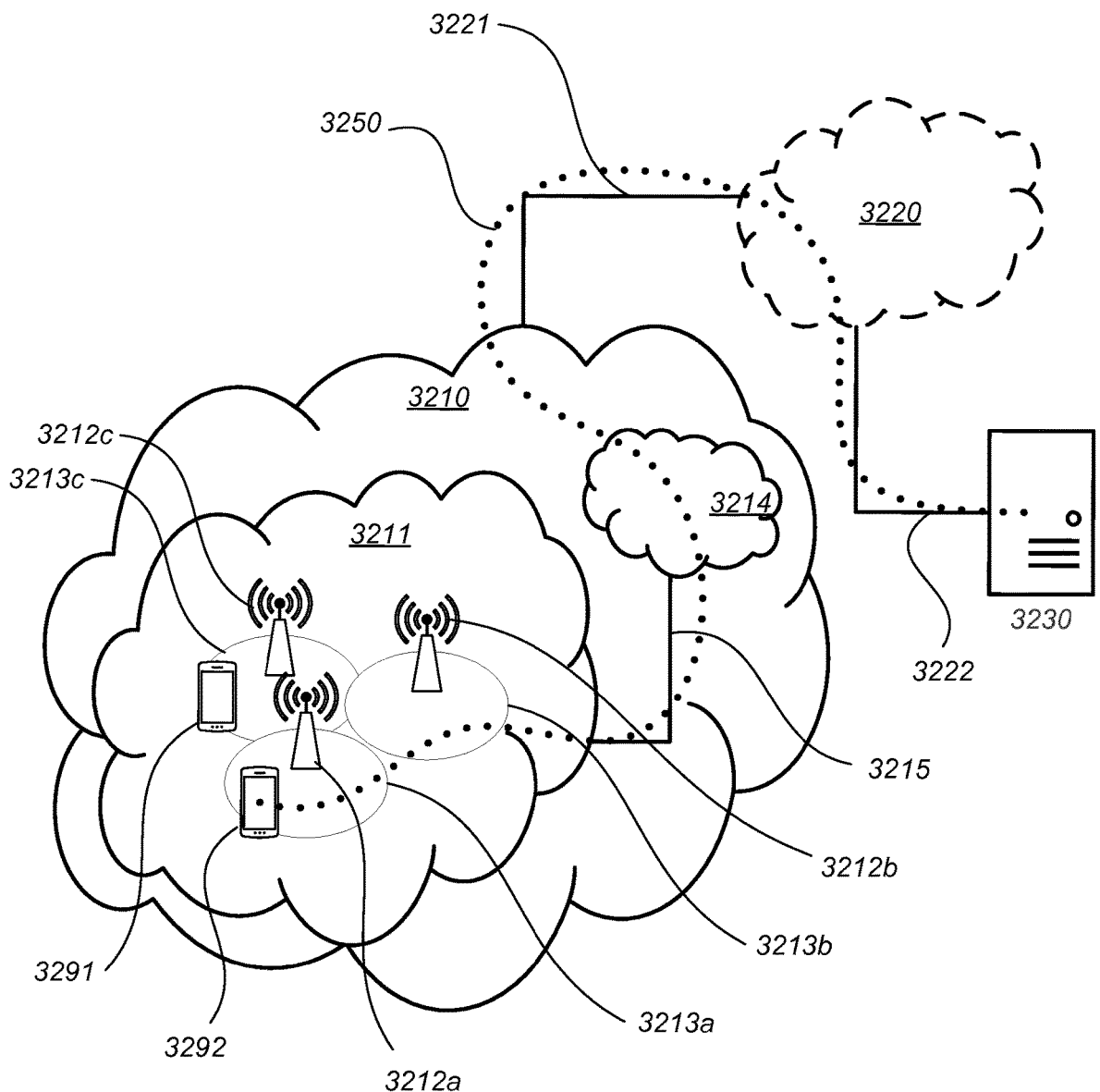
FIG. 20 schematically illustrates a telecommunication network connected via an intermediate network to a host computer.

With reference to FIG. 20, in accordance with an embodiment, a communication system includes a telecommunication network 3210, such as a 3GPP-type cellular network, which comprises an access network 3211, such as a radio access network, and a core network 3214. The access network 3211 comprises a plurality of network nodes or base stations 3212*a*, 3212*b*, 3212*c*, such as NBs, eNBs, gNBs or other types of wireless access points, each defining a corresponding coverage area 3213*a*, 3213*b*, 3213*c*. Each network node or base station 3212*a*, 3212*b*, 3212*c* is connectable to the core network 3214 over a wired or wireless connection 3215. A first wireless device 3291 located in coverage area 3213*c* is configured to wirelessly connect to, or be paged by, the corresponding base station 3212*c*. A second wireless device 3292 in coverage area 3213*a* is wirelessly connectable to the corresponding base station 3212*a*. While a plurality of wireless devices 3291, 3292 are illustrated in this example, the disclosed embodiments are equally applicable to a situation where a sole wireless device is in the coverage area or where a sole wireless device is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 20 as a whole enables connectivity between one of the connected wireless devicess 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 21. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 33) served by the base station 3320. The communication interface 3326 may be configured to facilitate a connection 3360 to the host computer 3310. The connection 3360 may be direct or it may pass through a core network (not shown in FIG. 33) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions.

The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 21:
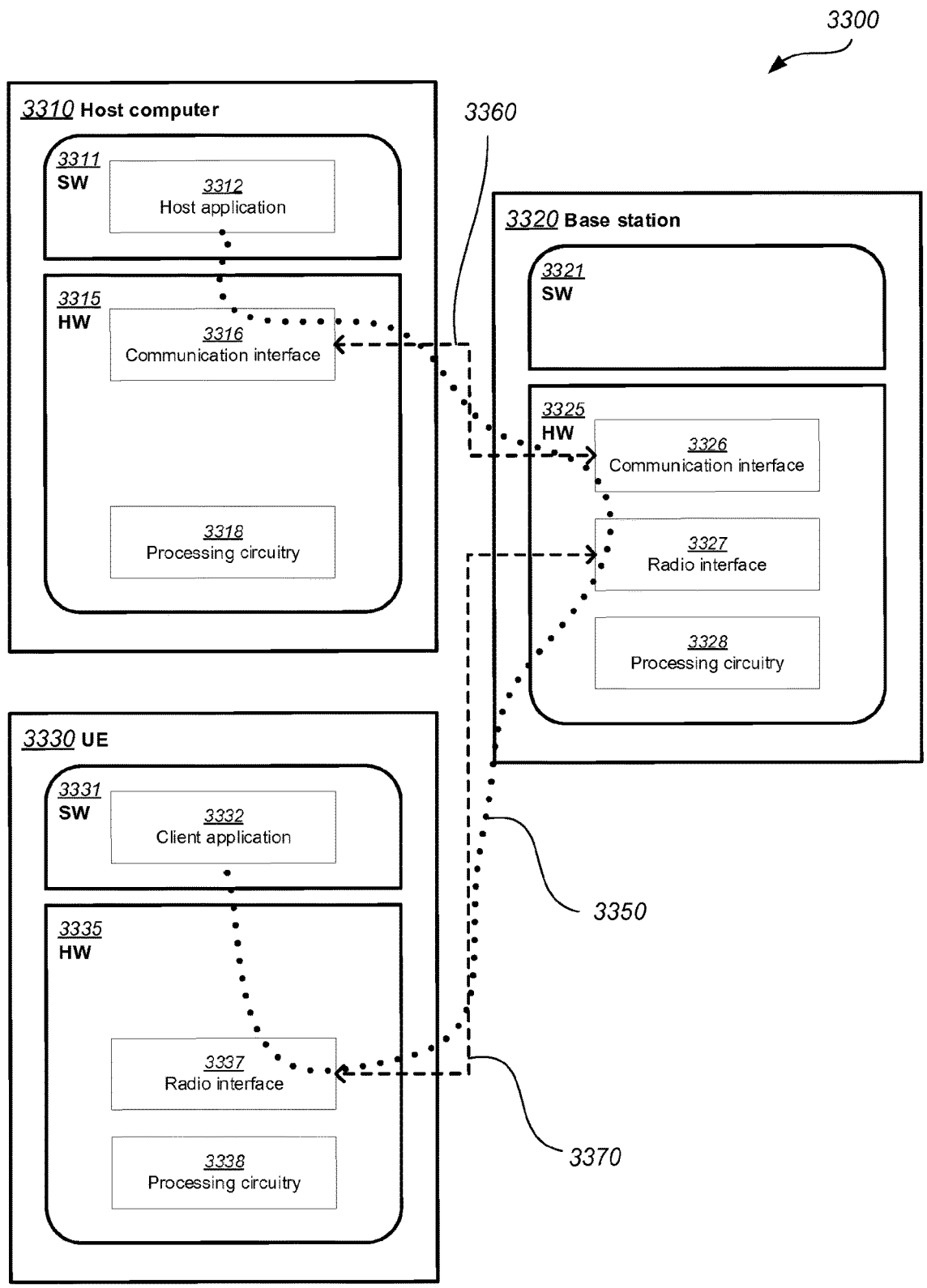
FIG. 21 is a generalized block diagram of a host computer communicating via a base station with a user equipment over a partially wireless connection.

It is noted that the host computer 3310, base station 3320 and UE 3330 illustrated in FIG. 21 may be identical to the host computer 3230, one of the base stations 3212a, 3212b, 3212c and one of the UEs 3291, 3292 of FIG. 20, respectively. This is to say, the inner workings of these entities may be as shown in FIG. 21 and independently, the surrounding network topology may be that of FIG. 20.

In FIG. 21, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the radio network security and integrity and thereby provide benefits such as simplified security procedures for accessing OTT services. In addition a number of the embodiments disclosed herein may be applied via the host computer 3310, for example the provision of timing difference information and checking UE access capabilities for provision of UE based provisioning "as-a-service". OTT features which rely on positioning may receive more accurate positioning information directly from the wireless device rather than via the location server (UE assisted positioning). This improves the latency for such OTT services and potentially reduces the number of positioning measurements a UE would need to perform, reducing the power consumption and processing load.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 22 is a flowchart illustrating a method implemented in a communication system, in accordance with one embodiment. The communication system includes a host computer, a base station and a wireless device or UE which may be those described with reference to FIGS. 20 and 21. For simplicity of the present disclosure, only drawing references to FIG. 22 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 23 is a flowchart illustrating a method implemented in a communication system, in accordance with one embodiment. The communication system includes a host computer, a base station and a wireless device or UE which may be those described with reference to FIGS. 20 and 21. For simplicity of the present disclosure, only drawing references to FIG. 23 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 24, 25:
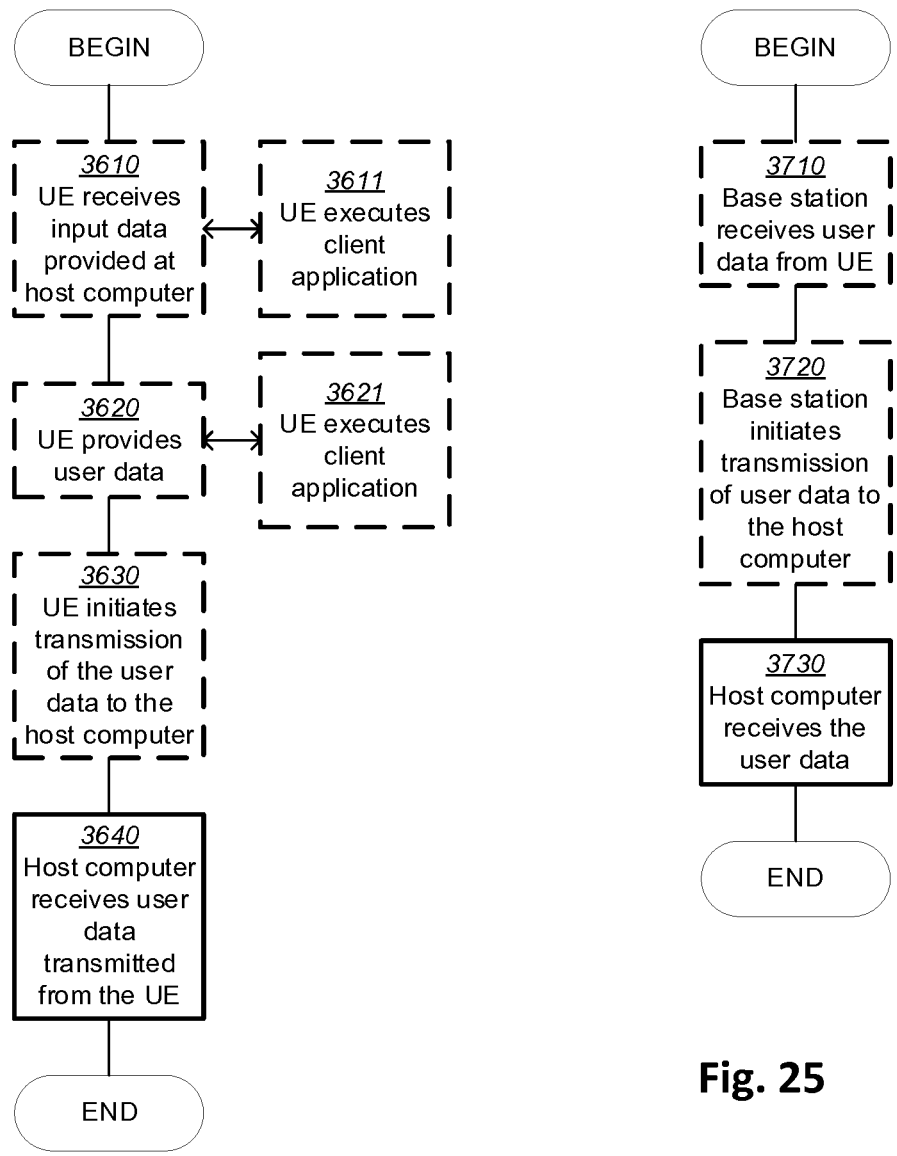

FIG. 24 is a flowchart illustrating a method implemented in a communication system, in accordance with one embodiment. The communication system includes a host computer, a base station and a wireless device or UE which may be those described with reference to FIGS. 20 and 21. For simplicity of the present disclosure, only drawing references to FIG. 24 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 25 is a flowchart illustrating a method implemented in a communication system, in accordance with one embodiment. The communication system includes a host computer, a base station and a wireless device or UE which may be those described with reference to FIGS. 20 and 21. For simplicity of the present disclosure, only drawing references to FIG. 25 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Numbered Embodiments Related to Host Computer Implementations

1. A base station configured to communicate with a user equipment (UE), the base station comprising a radio interface and processing circuitry configured to provide PRS transmission to one or more wireless devices, wherein the transmission is delayed or advanced from a scheduled transmission according to obtained offset information and/or provide radio related messaging piggybacking LPP messaging to the one or more wireless devices.

2. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to provide PRS transmission to one or more wireless devices, wherein the transmission is delayed or advanced from a scheduled transmission according to obtained offset information and/or provide radio related messaging piggybacking LPP messaging to the one or more wireless devices.

3. The communication system of embodiment 2, further including the base station.

4. The communication system of embodiment 3, further including the UE, wherein the UE is configured to communicate with the base station.

5. The communication system of embodiment 4, wherein:
  the processing circuitry of the host computer is configured to execute a host application, thereby providing the user data; and
  the UE comprises processing circuitry configured to execute a client application associated with the host application.

6. The communication system of embodiment 5, wherein:
  the host application is a UE based positioning service and wherein the host application comprises determining time difference information corresponding to a determined time relation between the shifted first PRS and a time of transmission of the second PRS from the second network node and;
  sending the determined time difference information to a wireless device for use in observed time difference of arrival positioning measurement.

7. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station provides PRS transmission to one or more wireless devices, wherein the transmission is delayed or advanced from a scheduled transmission according to obtained offset information and/or provide radio related messaging piggybacking LPP messaging to the one or more wireless devices.

8. The method of embodiment 7, wherein the user data is provided at the host computer by executing a host application, the method further comprising:
  at the UE, executing a client application associated with the host application.

9. The method of embodiment 8, wherein the host application is a UE based positioning service and wherein the host application comprises determining time difference information corresponding to a determined time relation between the shifted first PRS and a time of transmission of the second PRS from the second network node and;
  sending the determined time difference information to a wireless device for use in observed time difference of arrival positioning measurement.

10. A user equipment (UE) configured to communicate with a host computer executing a host application, wherein the UE communicates with the host computer via a base station, the UE comprising a radio interface and processing circuitry configured to:
  receive from the host computer, via the base station, time difference information relating to the difference in transmission of at least a first position reference signal, PRS, scheduled to be transmitted from a first network node as a synchronised PRS transmission with a second PRS transmission from a second network node, wherein the time difference information is computed based on at least the first PRS being shifted away from the scheduled transmission time for said PRS;
  receive expiration information corresponding to the time difference information;
  receive delayed or advanced PRS transmissions from the base station; and,
  perform positioning computation based on the received time difference information and the received PRS transmissions when the expiration information indicates the time difference information is valid.

11. A method implemented in a user equipment (UE), wherein the UE communicates with a host computer executing a host application, and wherein the UE communicates with the host computer via a base station, the method comprising:
receiving from the host computer, via the base station, time difference information relating to the difference in transmission of at least a first position reference signal, PRS, scheduled to be transmitted from a first network node as a synchronised PRS transmission with a second PRS transmission from a second network node, wherein the time difference information is computed based on at least the first PRS being shifted away from the scheduled transmission time for said PRS;
receiving expiration information corresponding to the time difference information;
receiving PRS transmissions from the base station; and,
performing positioning computation based on the received time difference information and the received PRS transmissions when the expiration information indicates the time difference information is valid.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

The invention claimed is:
1. A method performed by a network node for providing positioning reference signals, PRS, the method comprising:
obtaining offset information relating to the transmission of at least one positioning reference signal;
delaying or advancing the transmission of the at least one positioning reference signal in accordance with the received offset information wherein the delaying or advancing according to the offset information shifts the transmission of the at least one positioning reference signal away from a scheduled transmission time for the at least one positioning reference signal transmission;
the network node is a first network node and the scheduled transmission time for the at least one PRS comprises a first physical resource allocation for the transmission of the at least one PRS in the first network node;
a second network node synchronised with the first network node being scheduled to transmit a corresponding at least one PRS in a corresponding second physical resource allocation; and
the shift away from the scheduled transmission time of the first network node comprising the first network node transmitting the at least one PRS in a third physical resource allocation which is different from said first and second physical resource allocation.

2. The method of claim 1, wherein the network node is a first network node and the scheduled transmission time of the at least one PRS is transmitted from the first network node and has a corresponding scheduled PRS in a second network node, wherein the corresponding scheduled PRS is intended to be synchronised with the at least one PRS of the first network node.

3. The method of claim 1, wherein the first, second and third physical resource allocations comprise slots or subframes of a time-frequency resource grid and wherein the first and second resource allocations comprise corresponding slots or subframes of the time-frequency resource grid and the third resource allocation comprises different slots or subframes of the time-frequency resource grid compared to the slots of subframes allocated for the first and second resource allocations or wherein the first, second and third resource allocations comprise PRS occasions and wherein the first and second resource allocations comprise corresponding PRS occasions and the third resource allocation comprises a different PRS occasion to the first and second PRS occasions.

4. The method of claim 1, wherein the offset information comprises a sequence and wherein the network node applies a first offset value in the sequence when computing the time for transmission of the at least one positioning reference signal and applies a second offset value in the sequence when computing the time for transmission of a subsequent positioning reference signal.

5. The method of claim 1, further comprising:
sending at least one of:
location information of the network node;
local clock information;
positioning reference signals information.

6. A network node for providing positioning reference signals, PRS, the network node comprising processing circuitry and transceiver circuitry, the network node configured to:
receive, via the transceiver circuitry, offset information relating to the transmission of at least one positioning reference signal; and:
delay or advance the transmission of the at least one positioning reference signal in accordance with the received offset information wherein delay of advance of the transmission according to the offset information shifts the transmission of the first positioning reference signal away from a scheduled transmission time for the at least one positioning reference signal transmission;
the network node being a first network node and the scheduled transmission time for the at least one PRS comprising a first physical resource allocation for the transmission of the at least one PRS in the first network node;

a second network node synchronised with the first network node being scheduled to transmit a corresponding at least one PRS in a corresponding second physical resource allocation; and the shift away from the scheduled transmission time of the first network node comprising the first network node transmitting the at least one PRS in a third physical resource allocation which is different from the first and second physical resource allocation.

7. The network node of claim 6, wherein the network node is a first network node and the scheduled transmission time of the at least one PRS is transmitted from the first network node and has a corresponding scheduled PRS in a second network node, wherein the corresponding scheduled PRS is intended to be synchronised with the at least one PRS of the first network node.

* * * * *